(12) United States Patent
Perry

(10) Patent No.: US 10,348,600 B2
(45) Date of Patent: Jul. 9, 2019

(54) CONTROLLING FLOW RATES OF TRAFFIC AMONG ENDPOINTS IN A NETWORK

(71) Applicant: Flowtune, Inc., Cupertino, CA (US)

(72) Inventor: Jonathan Perry, Cupertino, CA (US)

(73) Assignee: Flowtune, Inc., Palo Alto, CA (US)

( * ) Notice: Subject to any disclaimer, the term of this patent is extended or adjusted under 35 U.S.C. 154(b) by 173 days.

(21) Appl. No.: 15/427,393

(22) Filed: Feb. 8, 2017

(65) Prior Publication Data

US 2017/0230298 A1  Aug. 10, 2017

Related U.S. Application Data

(60) Provisional application No. 62/292,914, filed on Feb. 9, 2016.

(51) Int. Cl.
| | |
|---|---|
| H04L 12/26 | (2006.01) |
| H04L 12/873 | (2013.01) |
| H04L 12/801 | (2013.01) |
| H04L 12/867 | (2013.01) |
| H04L 12/825 | (2013.01) |
| H04L 12/24 | (2006.01) |
| H04L 12/911 | (2013.01) |

(52) U.S. Cl.
CPC .......... *H04L 43/12* (2013.01); *H04L 41/0896* (2013.01); *H04L 43/0876* (2013.01); *H04L 47/10* (2013.01); *H04L 47/263* (2013.01); *H04L 47/522* (2013.01); *H04L 47/629* (2013.01); *H04L 43/0888* (2013.01); *H04L 47/78* (2013.01)

(58) Field of Classification Search
CPC ... H04L 43/12; H04L 41/0896; H04L 47/263; H04L 47/10; H04L 47/522; H04L 47/629; H04L 43/0876; H04L 43/0888; H04L 47/78
See application file for complete search history.

(56) References Cited

U.S. PATENT DOCUMENTS

| | | |
|---|---|---|
| 7,249,286 B1 | 7/2007 | Krishnan |
| 7,302,705 B1 | 11/2007 | Boivie |
| 7,475,157 B1 | 1/2009 | Tormasov |

(Continued)

FOREIGN PATENT DOCUMENTS

| | | |
|---|---|---|
| WO | WO 2015/000302 | 1/2015 |

OTHER PUBLICATIONS

Notification of Transmittal of the International Search Report and the Written Opinion of the International Searching Authority, or the Declaration for corresponding International Application No. PCT/US17/16904, dated May 22 2017, 22 pages.

(Continued)

*Primary Examiner* — Ian N Moore
*Assistant Examiner* — Justin T Van Roie
(74) *Attorney, Agent, or Firm* — Fish & Richardson P.C.

(57) ABSTRACT

Among other things, flow rates of traffic among endpoints in a network are controlled. Notifications are received about flowlets originating or received at the endpoints. Each of the flowlets includes one or more packets that are in a queue associated with a corresponding flowlet. In response to the received notifications, updated flow rates are computed for the flowlets. The updated flow rates are sent to devices for use in controlling flow rates for the flowlets in accordance with the computed updated flow rates.

30 Claims, 23 Drawing Sheets

(56) References Cited

U.S. PATENT DOCUMENTS

Figure 1:
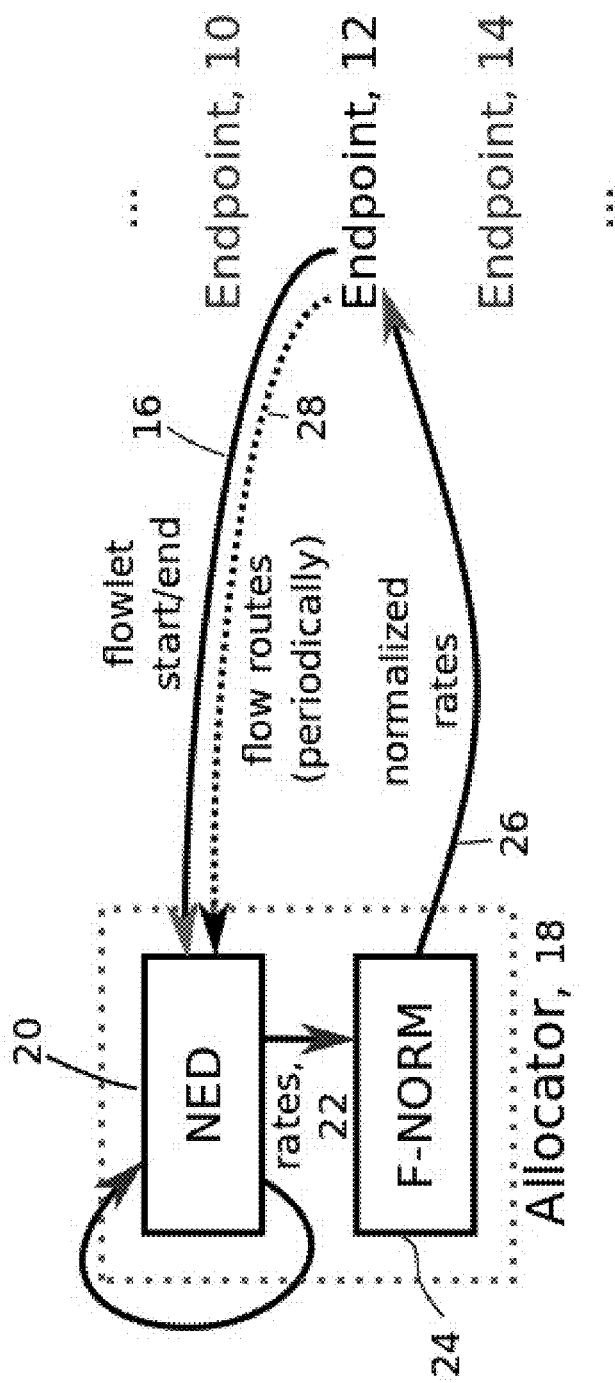

| | | | |
|---|---|---|---|
| 10,097,448 B1* | 10/2018 | Howard | H04L 45/22 |
| 2003/0007485 A1 | 1/2003 | Venkitaraman et al. | |
| 2004/0117349 A1 | 6/2004 | Moricz | |
| 2007/0242674 A1 | 10/2007 | Neuhaeusler | |
| 2009/0168664 A1 | 7/2009 | Washburn | |
| 2010/0287303 A1 | 11/2010 | Smith et al. | |
| 2011/0007631 A1 | 1/2011 | Raina et al. | |
| 2011/0026410 A1 | 2/2011 | Meloche | |
| 2011/0085469 A1 | 4/2011 | Klincewicz | |
| 2011/0216648 A1 | 9/2011 | Mehrotra et al. | |
| 2013/0198372 A1 | 8/2013 | Wei et al. | |
| 2013/0223550 A1 | 8/2013 | Fimoff et al. | |
| 2014/0019985 A1 | 1/2014 | Krajec | |
| 2014/0321325 A1 | 10/2014 | Jiang et al. | |
| 2015/0124652 A1 | 5/2015 | Dharmapurikar et al. | |

OTHER PUBLICATIONS

Andreyev, A., "Introducing data center fabric, the next-generation Facebook data center network", https://code.facebook.com/posts/360346274145943/introducing-data-center-fabric-the-next-generation-facebook-data-center-network/, Nov. 14, 2014, 13 pages.

Al-Fares et al., Hedera: Dynamic Flow Scheduling for Data Center Networks. In NSDI, 2010.

Alizadeh, M. et al., Data Center TCP (DCTCP). In SIGCOMM, 2010.

Alizadeh, M. et al., Less is More: Trading a Little Bandwidth for Ultra-Low Latency in the Data Center. In NSDI, 2012.

Alizadeh, M. et al., pFabric: Minimal near-optimal datacenter transport. In Proceedings of the ACM SIGCOMM 2013 conference on SIGCOMM, pp. 435-446. ACM, 2013.

Athuraliya, S. et al., Optimization Flow Control with Newton-like Algorithm. Telecommunication Systems, 15(3-4):345-358, 2000.

Beck, A. et al., A Gradient Method for Network Resource Allocation Problems. IEEE Trans. on Control of Network Systems, 1(1):64-73, 2014.

Brakmo, L. S. et al., TCP Vegas: New Techniques for Congestion Detection and Avoidance. In Proceedings of the Conference on Communications Architectures, Protocols and Applications, SIGCOMM '94, pp. 24-35, New York, NY, USA, 1994. ACM.

Calciu, I. et al., Using elimination and delegation to implement a scalable numa-friendly stack. In Proc. Usenix Workshop on Hot Topics in Parallelism (HotPar), 2013.

Chen, Y. et al., Design insights for mapreduce from diverse production workloads. In Tech. Rep. EECS-2012-17. UC Berkeley, 2012.

Chowdhury, M. et al., Efficient coflow scheduling with varys. In ACM SIGCOMM Computer Communication Review, vol. 44, pp. 443-454. ACM, 2014.

Dean, J. et al., The tail at scale. Comm. of the ACM, 2013.

Demers, A. et al., Analysis and Simulations of a Fair-Queueing Algorithm. Internetworking: Research and Experience, V(17):3-26, 1990.

Dong, M. et al., PCC: Re-architecting Congestion Control for Consistent High Performance. In NSDI, 2015.

Elwalid, A. et al., MATE: MPLS Adaptive Traffic Engineering. In INFOCOM, 2001.

Farrington, N. et al., Hunting Mice with Microsecond Circuit Switches. In HotNets, 2012.

Floyd, S., TCP and Explicit Congestion Notification. CCR, 24(5), Oct. 1994.

Floyd, S. et al., Random Early Detection Gateways for Congestion Avoidance. IEEE ACM Trans. on Net., 1(4), Aug. 1993.

Greenberg, A. et al., VL2: A Scalable and Flexible Data Center Network. In SIGCOMM, 2009.

Ha, S. et al., CUBIC: A new TCP-friendly high-speed TCP variant. ACM SIGOPS Operating Systems Review, 42(5):64-74, 2008.

Hendler, D. et al., Flat combining and the synchronization-parallelism tradeoff. In Proceedings of the twenty-second annual ACM symposium on Parallelism in algorithms and architectures, pp. 355-364. ACM, 2010.

Hoe, J. C., Improving the start-up behavior of a congestion control scheme for tcp. In Conference Proceedings on Applications, Technologies, Architectures, and Protocols for Computer Communications, SIGCOMM '96, pp. 270-280, New York, NY, USA, 1996. ACM.

Hong, C. Y. et al., Finishing Flows Quickly with Preemptive Scheduling. In SIGCOMM, 2012.

Hong, C. Y. et al., Achieving High Utilization with Software-Driven WAN. In SIGCOMM, 2013.

Jacobson, V., Congestion Avoidance and Control. In SIGCOMM, 1988.

Jain, S. et al., B4: Experience with a Globally-deployed Software Defined Wan. In Proceedings of the ACM SIGCOMM, 2013 Conference on SIGCOMM, SIGCOMM '13, pp. 3-14, New York, NY, USA, 2013. ACM.

Katabi, D. et al., Congestion Control for High Bandwidth-Delay Product Networks. In SIGCOMM, 2002.

Kelly, F. P. et al., Rate Control for Communication Networks: Shadow prices, Proportional Fairness and Stability. Journal of the Operational Research Societx, pp. 237-252, 1998.

Kumar, A. et al., Bwe: Flexible, hierarchical bandwidth allocation for wan distributed computing. In Proceedings of the 2015 ACM Conference on Special Interest Group on Data Communication, SIGCOMM '15, pp. 1-14, New York, NY, USA, 2015. ACM.

Low, S. H. et al., Optimization Flow ControlÂȚ-I: Basic Algorithm and Convergence. IEEE/ACM Trans. On Networking, 7(6):861-874, 1999.

Misra, V. et al., Fluid-based analysis of a network of AQM routers supporting TCP flows with an application to RED. In SIGCOMM, 2000.

Mittal, R. et al., TIMELY: RTT-based congestion control for the datacenter. In SIGCOMM, 2015.

Nagaraj, K. et al., Numfabric: Fast and flexible bandwidth allocation in datacenters. In Proceedings of the 2016 Conference on ACM SIGCOMM 2016 Conference, SIGCOMM '16, pp. 188-201, New York, NY, USA, 2016. ACM.

Nichols, K. et al., Controlling queue delay. Communications of the ACM, 55(7):42-50, 2012.

Perry, J. et al., Fastpass: A centralized "zero-queue" datacenter network. In SIGCOMM, 2014.

Roy, A. et al., Inside the social network's (datacenter) network. In Proceedings of the 2015 ACM Conference on Special Interest Group on Data Communication, SIGCOMM '15, pp. 123-137, New York, NY, USA, 2015. ACM.

Shapiro, N. et al., Conflict-five replicated data types. In Proceedings of the 13th International Conference on Stabilization, Safety, and Security of Distributed Systems, SSS'11, pp. 386-400, Berlin, Heidelberg, 2011. Springer-Verlag.

Sherwood, R. et al., Touring the internet in a tcp sidecar. In Proceedings of the 6th ACM SIGCOMM conference on Internet measurement, pp. 339-344. ACM, 2006.

Shreedhar, M. et al., Efficient Fair Queueing Using Deficit Round Robin. In *SIGCOMM*, 1995.

Singh, A. et al., Jupiter rising: A decade of clos topologies and centralized control in google's datacenter network. In Proceedings of the 2015 ACM Conference on Special Interest Group on Data Communication, SIGCOMM, '15, pp. 183-197, New York, NY, USA, 2015. ACM.

Tai, C. et al., Making Large Scale Deployment of RCP Practical for Real Networks. In *INFOCOM*, 2008.

Tan, K. et al., A compound TCP approach for high-speed and long distance networks. In *INFOCOM*, 2006.

Vattikonda, B. C. et al., "Practical TDMA for Datacenter Ethernet", In EuroSys, 2012.

Wei, D. X. et al., Fast tcp: motivation, architecture, algorithms, performance, IEEE/ACM Transactions on Networking (ToN), 14(6):1246-1259, 2006.

(56) References Cited

OTHER PUBLICATIONS

Wei, E. et al., "A Distributed Newton Method for Network Utility Maximization—I: Algorithm", IEEE Trans. on Automatic Control, 58(9):2162-2175, 2013.
Winstein, K. et al., "Stochastic Forecasts Achieve High Throughput and Low Delay over Cellular Networks", In NSDI, 2013.
Zargham, M. et al., Accelerated dual descent for network flow optimization, IEEE Trans. on Automatic Control, 59(4):905-920, 2014.

* cited by examiner

Figure 7A:
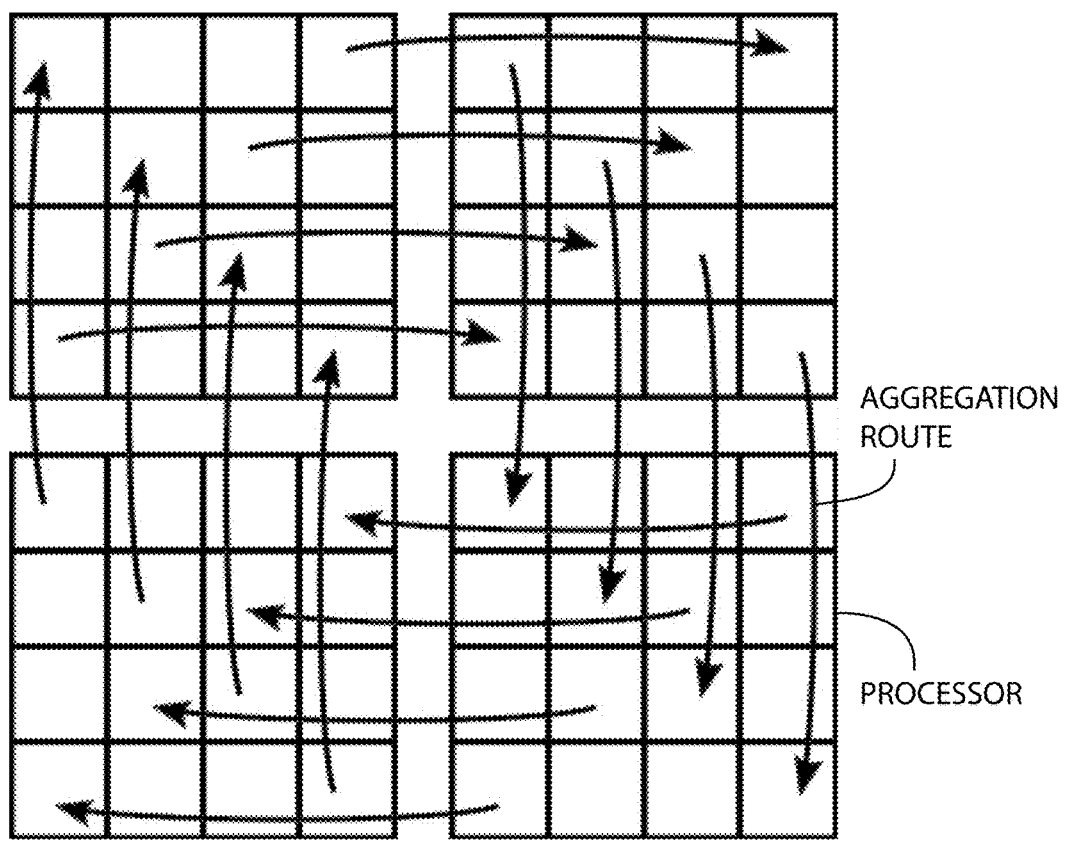

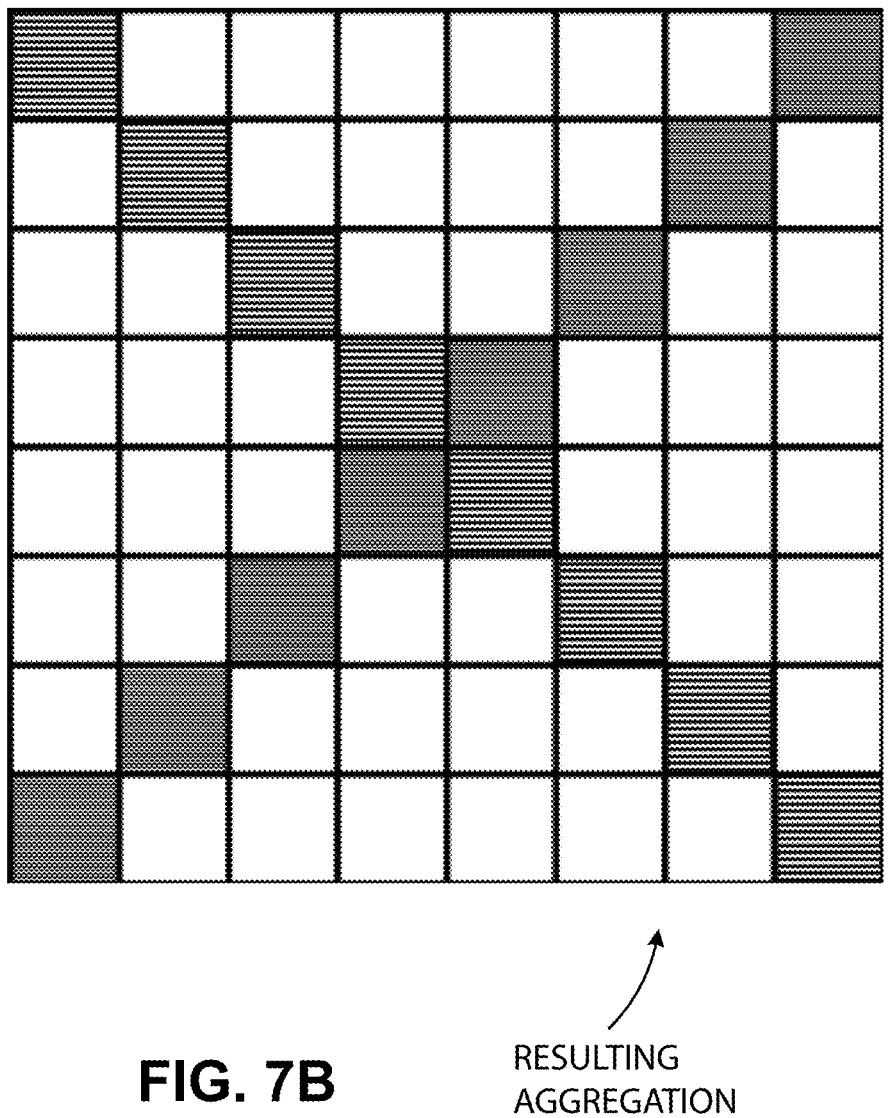
FIG. 7B  RESULTING AGGREGATION

CONTROLLING FLOW RATES OF TRAFFIC AMONG ENDPOINTS IN A NETWORK

CLAIM OF PRIORITY

This application claims priority under 35 USC § 119(e) to U.S. Provisional Patent Application No. 62/292,914, filed on Feb. 9, 2016, the entire contents of which are hereby incorporated by reference.

BACKGROUND

The description relates to network resource allocation.

A typical datacenter network, for example, enables packet-switched communication among endpoints of the datacenter. Intense use of the network to carry packet traffic among devices at the endpoints can cause congestion and non-optimal use of network resources.

Over the past thirty years, network congestion control schemes—whether distributed or centralized, whether end-to-end or with switch support, and whether in the wide-area Internet or in low-latency datacenters—have operated at the granularity of individual packets. In these approaches, endpoints transmit data at a rate (window) that can change from packet to packet.

This packet-level network resource allocation has become the de facto standard approach to the problem of determining the rates of each flow of packets from one endpoint to another endpoint in a network.

Rapid convergence to a desired allocation of network resources to endpoint traffic is a difficult problem because in typical approaches congestion control decisions are distributed among the endpoints. In some schemes, the endpoints vary their offered traffic load—in response to changes in demand by applications running on the endpoints and to network feedback—on a packet-by-packet basis.

SUMMARY

By contrast to packet-level network resource allocation, if it were possible to determine optimal rates for a set of flows sharing a network, then those rates would have to change only when new flows arrive at or flows leave the network. Avoiding or reducing packet-level rate fluctuations could help achieve fast convergence to optimal rates.

Here we adopt the position that a flowlet, and not a packet, represents a better level of granularity for congestion control. We describe implementations in which close-to-optimal rates are computed for a set of active flowlets and those rates are updated dynamically as flowlets enter and leave the network from the endpoints. We use the term "flowlet" broadly to include, for example, any batch of one or more packets that are held at a sending endpoint's (which we sometimes call simply a sender) queue. In some implementations, a flowlet ends when there is a threshold amount of time during which a sender's queue is empty; such a threshold is not inherent in the meaning of "flowlet.".

In some implementations, a flowlet corresponds to all the packets generated by a send( ) or other socket call of an application, or to a collection of such calls; such a correspondence to a socket call is not inherent in the meaning of "flowlet.".

In some implementations, a flowlet corresponds to a collection of packets that a layer of the network stack decides to burst to a lower layer—for example when the TCP stack decides to send several packets according to the congestion window; such a correspondence to a layer's decision is not inherent in the meaning of "flowlet.".

The flowlet control approach that we describe here, in which congestion control decisions are made at the granularity of a flowlet, not a packet, is especially useful for datacenter networks and other low latency networks such as enterprise and carrier networks (and perhaps less useful in the wide-area Internet).

In some situations, with flowlet control, allocations of network resources have to change, if at all, only when flowlets arrive at or leave an endpoint.

One implementation of our approach is a system called Flowtune™ that, along with a broad range of other possible implementations use a network resource allocator that, in some cases, receives flowlet start and flowlet end notifications from endpoints. In some implementations, when the flowlet is not characterized as ending at a particular time threshold, the endpoints could notify the allocator of the size of a new flowlet rather than when it starts and ends. The allocator computes optimal data rates for respective flowlets using a new, fast method for network utility maximization, and updates endpoint congestion-control parameters based on the result of the computation. In some examples, the allocation could be implemented in other ways and by other devices such as in hardware elements (switches or routers) of the network or in software in the application running on the endpoint device or in the operating system, among others. When it is the operating system that enforces the allocation, this could be done using a control mechanism external to the flow such as a rate limiter, or flow-related mechanisms such as TCP pacing, changing TCP windows or congestion parameters.

In some implementations, the allocator can be characterized as logically centralized in that it is responsible for calculating rates and distributing them to multiple endpoints. We say "logically centralized" to make clear that, although the allocator could be implemented as a single process on a single processor, it could also be implemented as multiple processes on a single processor or as multiple processes on multiple processors that are co-located or distributed. We use the term "processor" broadly to include any device on which a process can be executed, for example, as any platform that can perform a computation such as a CPU, GPU, FPGA, NPU, custom ASIC, or any other component that executes code.

Experiments show that the Flowtune implementation outperforms DCTCP, pFabric, sfqCoDel, and XCP on tail packet delays in various settings, converging to optimal rates within a few packets rather than over several RTTs (round trip times). Benchmarks on an EC2 deployment show more fair rate allocation than Linux's Cubic. A data aggregation benchmark shows 1.61× lower p95 coflow completion time.

Therefore, in general, in an aspect, flow rates of traffic among endpoints in a network are controlled. Notifications are received about flowlets originating or received at the endpoints. Each of the flowlets includes one or more packets that are in a queue associated with a corresponding flowlet. In response to the received notifications, updated flow rates are computed for the flowlets. The updated flow rates are sent to devices for use in controlling flow rates for the flowlets in accordance with the computed updated flow rates.

Implementations may include one or combinations of two or more of the following features. The notifications are received from devices in the network including switches or other devices at which flow is monitored. The devices include switches or other implementation devices. The network includes links and each of two or more processing cores receives the notifications only with respect to a particular subset of the links and sends the updated flow rates only for flowlets associated with the particular subset of the links. The respective particular subsets of links to be received by respective processing cores are based on the number of processing cores that will process flows carried on the links. Each of the links includes a half-duplex or other single-directional link. The processing cores include cores that process received flows and cores that process transmit flows. The computing of the updated flow rates for the flowlets includes applying an explicit optimization process. The optimization process includes a modified Newton-like method. The modified Newton-like method includes an optimization process that finds prices for links of the network. The prices include penalties for exceeding capacities of links of the network. The modified Newton-like method includes applying LaGrange multipliers. The computing of the updated flow rates for the flowlets includes estimating effects on flows that will occur as a result of one or more of the updates. The optimization process uses a network utility maximization framework. The optimization process uses a weighted proportional fairness objective. The updated flow rates are computed to tend to reach a global network resource allocation objective. The updated flow rates are computed to reduce over-allocation of flows on links of the network. The updated flow rates are computed to reduce delays in the queues. The computing of the updated flow rates for the flowlets includes reusing computations performed when computing previous updated flow rates. The notifications are received from the devices and the updated flow rates are sent to the devices through a kernel bypass at the devices. A rate normalizer is applied to the updated flow rates. The rate normalizer normalizes rates to link capacities. The computing of updated flow rates includes organizing the computation based on flow blocks and link blocks. The updated flow rates are computed based on information about applications that are associated with the flowlets. The information about the application includes at least one of the identity of the application that started a flow, the identity of a user who started the application, a CPU load generated by the application, what files are open for the application, the read and write throughputs in aggregate or to each individual file, or the amount of memory used by the application. The sending of the updated flow rates to devices for use in controlling flow rates includes sending the updated flow rates only when the updated flow rates change by a factor larger than a threshold. The sending of the updated flow rates to devices for use in controlling flow rates includes sending the updated flow rates from intermediary servers that are associated with respective subsets of the endpoints. The paths of flows in the network are traced. The path is determined based on at least one of ECMP hashes of the flow, or a software defined networking controller, tunneling configuration, or MPLS configuration associated with the flow. The tracing includes tracing the paths of only large flows. The tracing includes mutilating a TCP checksum to cause an endpoint to drop a probe packet without terminating a connection or notifying an application. The tracing includes opening a raw socket. The tracing includes sending multiple probes in parallel distinguished by sequence number.

In general, in an aspect, rates of flow at endpoints of a network are controlled. A device in the network sends notification of a start or end of a flowlet at an endpoint of the network. The notification is sent to an allocator to which other devices send notifications with respect to other flowlets. At the device, a communication rate is received from the allocator. The rate is one of a set of communication rates for flowlets starting and ending at endpoints of the network. The device controls a rate of communication on a link of the network based on the received communication rate.

Implementations may include one or a combination of two or more of the following features. The device sends the notification when a queue in the network is not empty. The device determines a path of the flowlet through the network and reports the path to the allocator.

In general, in an aspect, network resources are allocated to devices at endpoints of a network. A modified Newton like process is applied to optimize current flow rates at respective devices based on information about flowlets starting or ending at the devices, the capacities of links of the network, and information about the paths of the flowlets through the network.

These and other aspects, features, implementations, and advantages can be expressed as methods, apparatus, systems, components, program products, business methods, means or steps for performing functions, and in other ways.

These and other aspects, features, implementations, and advantages will be further understood from the following description and from the claims.

DESCRIPTION

FIG. 1 is a block diagram.

Figure 2:
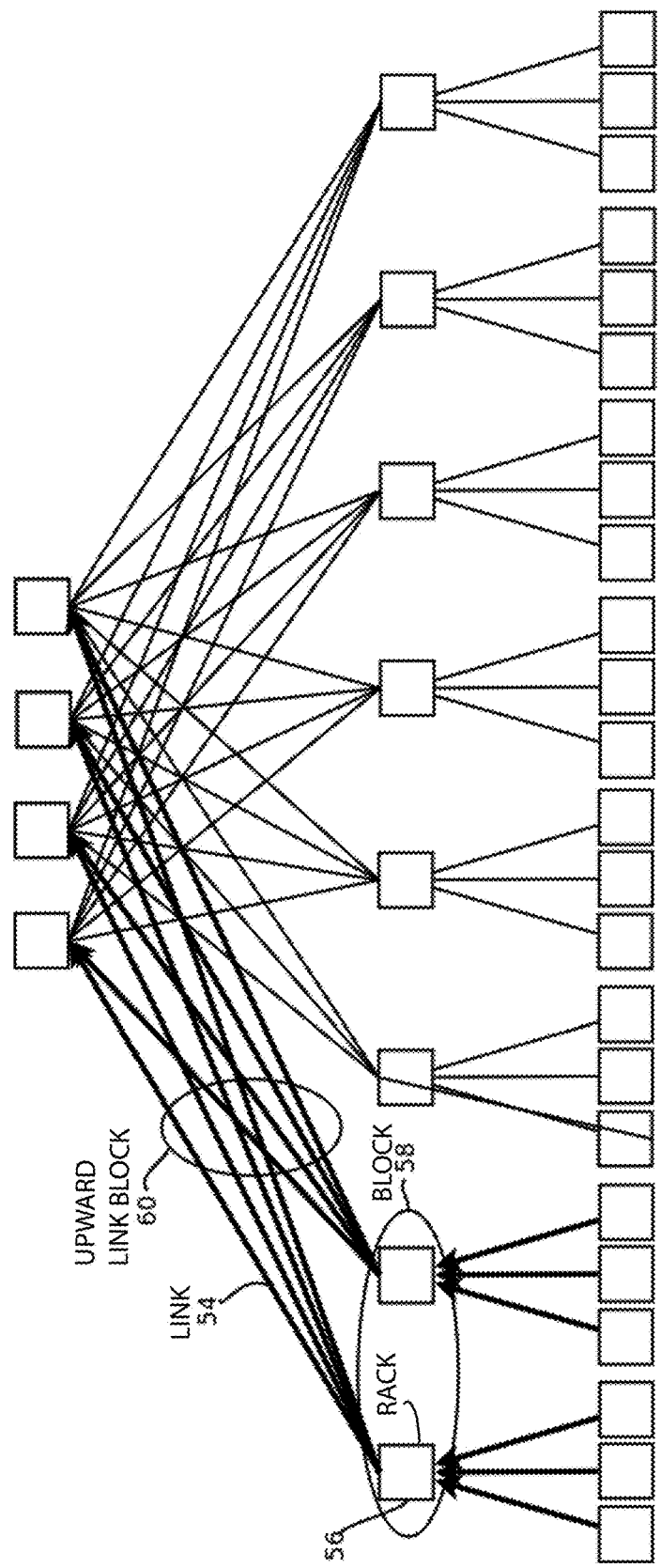
Figure 3:
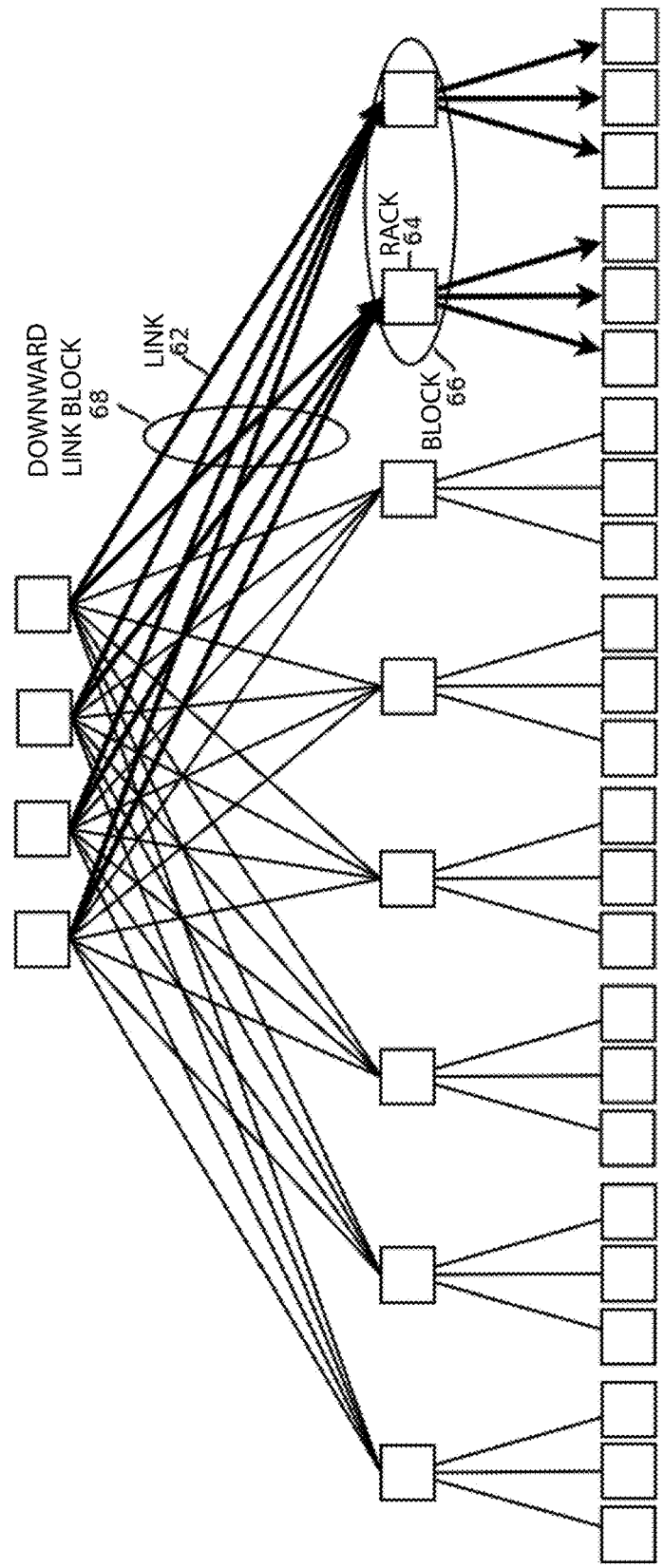
Figure 4:
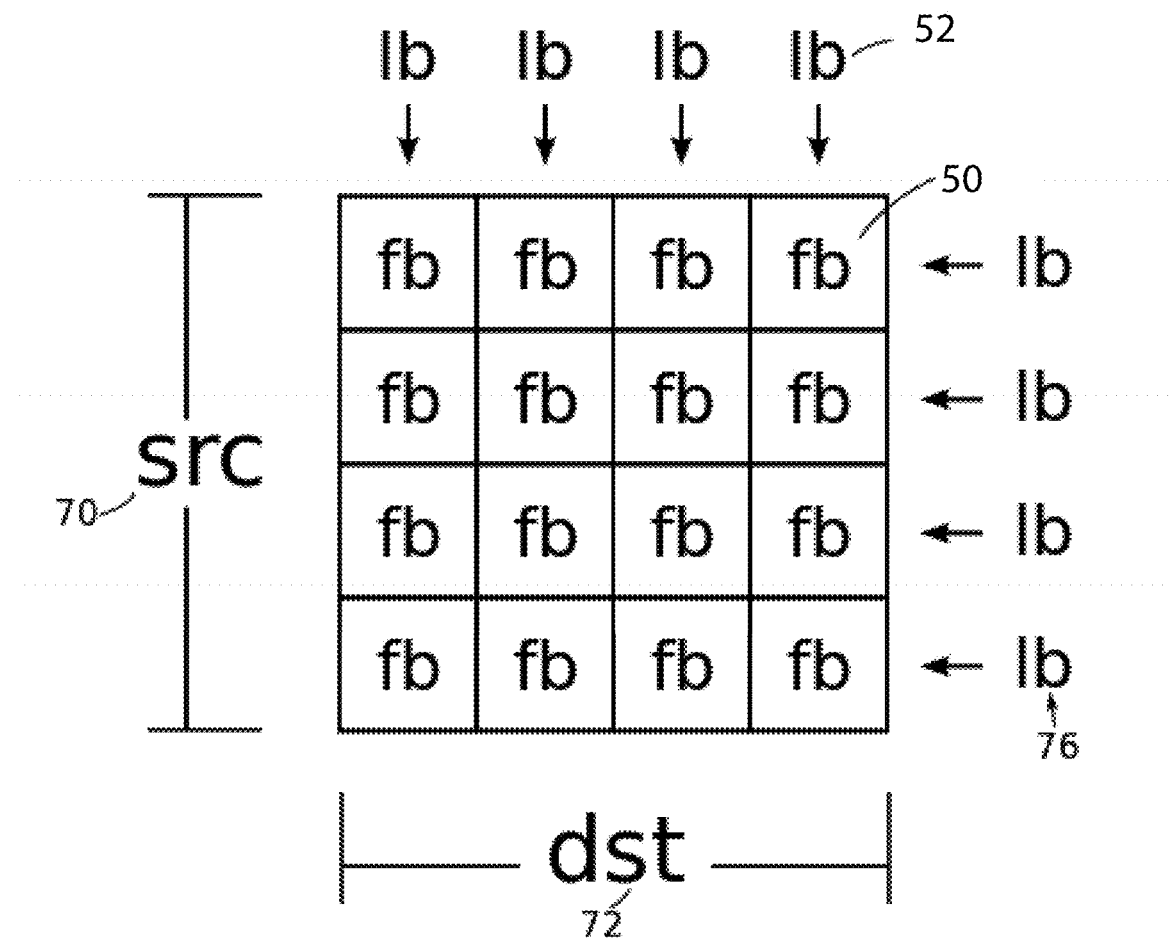

FIGS. 2, 3, and 4 are schematic diagrams of flow blocks and link blocks.

FIGS. 5A, 5B, 6A, 6B, 7A, 7B, 8A, and 8B are schematic diagrams of a process of aggregation.

FIGS. 9 through 20 are graphs.

In datacenters, fast convergence of allocations of network resources is critical, as flowlets tend to be short (one study shows that the majority of flows are under 10 packets [Y. Chen, S. Alspaugh, and R. H. Katz. Design insights for mapreduce from diverse production workloads. In Tech. Rep. EECS-2012-17. UC Berkeley, 2012.]) and link capacities are large (40 Gbits/s and increasing). If it takes more than, say, 40 μs to converge to the right rate for a flowlet, then most flowlets will have already finished before convergence. Most current approaches use distributed congestion control, and generally take multiple RTTs to converge. By contrast, in some implementations, the approach that we describe here uses a logically centralized rate allocator. Flowtune is one example of logically centralized allocation of rates to flowlets; there are a wide variety of other implementations that could be used.

Computing the optimal or close-to-optimal rates is difficult because even one flowlet arriving or leaving could, in general, cause updates to the rates of many existing flows, which in turn could cause updates to more flows, and so on. To solve this problem in a scalable way, some examples of the logically centralized allocation approach that we describe here use the network utility maximization (NUM) framework, previously developed by Kelly et al., to analyze distributed congestion control protocols. In versions of our allocation approach, the logically centralized allocator optimizes an objective like proportional fairness, i.e., max $\Sigma_i U(x_i)$, where $U(x_i) = \log x_i$ (for example), and $x_i$ is the throughput of flowlet i. We introduce a new method, termed Newton-Exact-Diagonal (NED), to perform this computation in a fast and scalable way.

A scalable implementation of the logically centralized optimization algorithm on processors would run in parallel on multiple cores. Unfortunately, straightforward implementations are slowed by expensive cache-coherence traffic, and generally CPU and non-CPU implementations are faced with the problem of sharing data between processor elements. We describe a partitioning of flows to cores of the logically centralized allocator where each core only interacts with a small set of the communication links of the network. In this text by core we mean any kind of processor. Each core has copies of the link states it needs. Before manipulating a link state to update the link's price, the algorithm aggregates all modified copies of link state to authoritative copies. Afterwards, the algorithm distributes copies back to the cores that desire copies of the link state. This scheme allows some implementations to allocate 15.36 Tbits/s in 8.29 μs (on 4 Nehalem cores, 40 Gbits/s links), up to 184 Tbits/s in 30.71 μs (64 Nehalem cores, 40 Gbits/s links).

This partitioning of flows to cores is more general than the allocation problem. A similar approach can be used for any setting that involves two entity types A and B, where A-entities (flows in the allocation example) are each associated with one or more B-entities (links in the allocation example), and it is desired to compute some features of B-entity's state (prices in the example) using A-entity states (flow rates in the example) associated with the B-entity, and some of A-entity's state using B-entity states associated with the A-entity.

Another general way of phrasing such a partitioning is as follows: consider a graph comprised of nodes and edges (links in the example). There is a collection of paths on the graph. One wants to update node and link state and wants to use, perhaps among other data, path state. Or, one wants to compute path state and wants to use, perhaps among other data, link and/or node state. The partitioning distributes paths to processors. Each processor maintains copies of link and node state for all links and nodes its paths traverse. Copies can be updated from path state, these copies then are aggregated into authoritative node and link states. Then an update of node and link states can be performed, and copies of states distributed back to path processors.

In some cases, our allocation approach can be implemented in a Linux kernel module and a C++ allocator process that implements the multi-core NED algorithm that we describe below and uses kernel-bypass for NIC access to the endpoints in the allocator. The kernel module enforces rate allocations on unmodified Linux applications running at the endpoints. In one case, we deployed our allocation approach on Amazon Web Services instances; experiments show the servers are able to achieve their fair share of available network resources, with much better fairness than the Linux baseline (which uses Cubic). Our approach reduced p95 Coflow Completion Times [M. Chowdhury, Y. Zhong, and I. Stoica. Efficient coflow scheduling with varys. In ACM SIGCOMM Computer Communication Review, volume 44, pages 443-454. ACM, 2014.] by 1.61× on a data aggregation benchmark.

Simulation results show that implementations of our allocation approach out-perform distributed congestion control methods like DCTCP, pFabric, Cubic-over-sfqCoDel, and XCP on metrics of interest like the convergence time and the 99% ile ("p99") of the flow completion time (FCT).

Compared with the centralized arbitration in Fastpass [J. Perry, A. Ousterhout, H. Balakrishnan, D. Shah, and H. Fugal. Fastpass: A centralized "zero-queue" datacenter network. In SIGCOMM, 2014.], implementations of the approach that we describe here can offer similar fast convergence, but are able to handle 10.4× traffic per core and utilize 8× more cores, for an improvement in throughput by a factor of 83. Another advantage over Fastpass is better fault tolerance because in Fastpass flows share fate with the arbiter: when the arbiter fails, the network has no idea who should transmit next. Fastpass must replicate the arbiter and implement a failover scheme to tolerate arbiter failures, increasing system complexity. By contrast, in the approach that we describe here, if the allocator fails, traditional TCP congestion control takes over, and rate allocations remain close to optimal for a while. A network using our approach can recover from failure quickly even without any replication.

Architecture

As shown in FIG. 1, in some implementations, each endpoint 10, 12, 14 reports 16 to the logically centralized allocator 18 when a flowlet starts or ends at the endpoint. On each such notification, the logically centralized allocator runs its optimizer process NED 20, which computes a current set of rates 22 for all of the flows in the network. The optimization may cause some of these rates to temporarily exceed the capacities of some network links, causing queuing delays in the queues in the network, for example, queues that are situated just before the links (such as queues in switches). To reduce queuing delays, in some instances, the logically centralized allocator uses a rate normalizer (F-NORM) 24 to scale-down the computed values. The normalizer's results (i.e., the normalized current flow rates 26) are sent to the endpoints as updates to congestion-control parameters (window sizes or rates) maintained at the endpoints. Endpoints then transmit according to these rates and within these windows (i.e., they are trusted, similar to trust in TCP transmissions).

In some examples, the allocator does not select flow paths for the flows, but rather optimizes flow rates given the paths the network selects for each flow, as described in more detail later. In general, the allocator can allocate rates both and select paths.

However if path information is not available to the allocator, endpoints can report their flows' paths 28 at regular intervals to the allocator.

This signaling of the paths to the allocator allows the network to use any routing method, including equal-cost multipath (ECMP) routing, which may change the path of a flow from time to time. We describe a method with which endpoints discover the path used for each flow.

Consider a network with a set of flows. Suppose a new flow starts or a flow ends. If we could set each flow's rate explicitly, what would we set it to?

The problem is that even one flow arriving or leaving can cause changes in the rates of an arbitrary subset of flows. Certainly flows that share a bottleneck with the new or ending flow would change their rates. But if some of these flows slow down, the other flows elsewhere in the network might be able to speed up, and so on. The effects can cascade.

To solve the problem of determining flow rates under flow churn (the coming and going of flows), we turn to the network utility maximization (NUM) framework [F. P. Kelly, A. K. Maulloo, and D. K. Tan. Rate Control for Communication Networks: Shadow prices, Proportional Fairness and Stability. Journal of the Operational Research Society, pages 237-252, 1998. S. H. Low and D. E. Lapsley. Optimization Flow Control Á T-I: Basic Algorithm and Convergence. IEEE/ACM Trans. on Networking, 7(6):861-874, 1999.]. NUM offers three potential benefits. First, it allows network operators to specify an explicit objective and allocate rates that optimize that objective. Second, because previous work has shown that traditional congestion-control protocols often map to the NUM framework, NUM may be a reasonable approach for logically centralized allocation. Third, it is possible to develop a fast, logically centralized method for rate allocation in this framework, which produces rates that outperform prior distributed schemes.

We have devised an approach to perform the optimization quickly; we term this method Newton-Exact-Diagonal (NED), because it is based on a "Newton-like" method [S. Athuraliya and S. H. Low. Optimization Flow Control with Newton-like Algorithm. Telecommunication Systems, 15(3-4):345-358, 2000.] but takes advantage of the properties of logically centralized allocation to speed up its execution.

Fault-Tolerance.

Our allocation approach has a more attractive fault-tolerance plan than Fastpass and centralized SDN (software defined networking) controllers, both of which rely on replication and, in the case of SDN, maintaining state consistency. In our approach, the allocated current rates have a temporary lifespan, and new allocated rates must arrive every few tens of microseconds at the endpoints. If the allocator fails, the rates expire and endpoint congestion control (e.g., TCP) takes over, using the previously allocated rates as a starting point. If the allocator only experiences a short failure, network rates will still be close to optimal when operation resumes.

Objective Function.

Our allocation approach uses a different objective function than Fastpass. The reason is that Fastpass is limited to methods that map to a weighted maximal matching to determine packet transmission times, such as max-min fairness or (approximately) minimum mean flow completion times. Our approach can achieve a variety of desirable objectives such as weighted proportional fairness, which we describe here. In general, our approach supports any objective where flow utility is a function of the flow's allocated rate, and different flows may have different utility functions, under some requirements of utility functions discussed later.

Below, we describe two key mechanisms of our allocation approach: the NED flow optimizer, and reducing queuing delays using normalization. We also show how a parallel multicore implementation of the optimizer and normalizer can determine flow rates with low latency, and we present results on the performance of these methods and compare the results with other schemes. In addition, we explain an approach to discovering the paths used by endpoint flows.

Rate Allocation

In some implementations, our approach uses a rate allocation algorithm at the logically centralized allocator that uses the NUM framework. In the context of Internet congestion control, the NUM framework has helped the community understand what existing protocols were doing and helped develop a delay-based algorithm (FAST TCP [D. X. Wei, C. Jin, S. H. Low, and S. Hegde. Fast tcp: motivation, architecture, algorithms, performance. IEEE/ACM Transactions on Networking (ToN), 14(6):1246-1259, 2006.]).

Here, we use NUM as the basis for a new allocation strategy. Solving an explicit optimization problem allows our approach to converge rapidly to the desired optimal solution.

In the following discussion, we start by introducing necessary notations followed by presenting a rate allocation algorithm that is a heuristic implementation of primal-dual Newton's method. We explain why such is the case after presenting the algorithm by introducing the network optimization framework. We discuss and contrast the algorithm presented with other known approaches utilized in the context of network optimization and congestion control literature.

The goal of the optimization is to assign current rates to network flows that maximize a utility function such that network link capacities are not exceeded. Here we introduce some notation and detail how finding prices for links provides a solution to the network optimization problem. We then present an example optimizer algorithm, which we term the Newton-Exact-Diagonal (NED) algorithm, for finding prices, along with intuition into its operation and related algorithms.

The following table shows our notation:

| | | | |
|---|---|---|---|
| L | Set of all links | L(s) | Links traversed by flow s |
| S | Set of all flows | S(l) | Flows that traverse link l |
| $p_l$ | Price of link l | $c_l$ | Capacity of link l |
| $x_s$ | Rate of flow s | $U_s(x)$ | Utility of flow s |
| $G_l$ | | By how much link l is over-allocated | |
| $H_{ll}$ | | How much flow rates on l react to a change in $p_l$ | |

The algorithm will associate a price parameter $p_l$ with each link $l \in L$. The price parameter is an appropriate dual variable arising from network optimization as explained below.

The NUM Framework.

The allocation would be trivial if no two flows shared any link: the rate for flow $s \in S$ would be $x_s = \min_{l \in L(s)} c_l$. The problem becomes complicated when multiple flows share multiple links, as in most networks in practice. The goal is to allocate rates to all flows subject to network resource constraints: for each link $l \in L$, $$\sum_{s \in S(l)} x_s \leq c_l. \qquad (1)$$

In general many allocations can satisfy this constraint. From among these, NUM proposes that we should choose the one that maximizes the overall network utility, $\Sigma_{s \in S} U_s(x_s)$. Thus, the rate allocation should be the solution to the following optimization problem:

$$\max \sum_s U_s(x_s) \qquad (2)$$

over $x_s \geq 0$, for all $s \in S$, subject to equation (1).

Solving NUM Using Prices.

The capacity constraints in (1) make it hard to solve the optimization problem directly. Kelly's approach to solving NUM is to use Lagrange multipliers, which replace the hard capacity constraints with a "utility penalty" for exceeding capacities. This is done by introducing prices for links.

With prices available, each flow can itself selfishly optimize its own profit by choosing a rate whose utility, minus the price it pays per unit bandwidth on the links it traverses, is maximized. Although each flow is treated as selfish, the algorithm still converges to a global optimum because prices force flows to make globally responsible rate selections. We discuss the requirements for convergence further below. However, schemes where endpoints compute flow rates are slow: prices need to be communicated to endpoints, and then the rates determined at the endpoints need to be communicated in order to enable adjustment of prices. In our allocation approach, the allocator itself uses prices to compute flow rates (doing so as a proxy for the endpoints) so the price adjustment can proceed faster at the allocator. These computed flow rates are then communicated to the endpoints (rather than price information).

The way prices are adjusted is a key differentiator among different algorithms to solve NUM. Simplistic methods can adjust prices too gently and be slow to converge, or adjust prices too aggressively and cause wild fluctuations in rates, or not even converge.

Adjusting Prices.

An important quantity to consider when adjusting prices is by how much each link is over-allocated, i.e., $G_l = (\sum_{s \in S(l)} x_s) - c_l$. If $G_l > 0$, the link price should increase; if $G_l < 0$ it should decrease.

Gradient.

Arguably the simplest algorithm for adjusting prices is Gradient projection [S. H. Low and D. E. Lapsley. Optimization Flow Control AT-I: Basic Algorithm and Convergence. IEEE/ACM, Trans. on Networking, 7(6):861-874, 1999.], which adjusts prices directly from the amount of over-allocation:

$$p_l \leftarrow p_l + \gamma G_l.$$

Gradient's shortcoming is that it doesn't know how sensitive flows are to a price change, so it must update prices very gently (i.e., $\gamma$ must be small). This is because depending on flow utility functions, large price updates might cause flows to react very strongly and change rates dramatically, causing oscillations in rates and failure to converge. This results in very timid price updates that make Gradient slow to converge.

Newton's Method.

Unlike the gradient method, Newton's method takes into account second-order effects of price updates. It adjusts the price on link 1 based not only on how flows on 1 will react, but also based on how price changes to all other links impact flows on 1:

$$p \leftarrow p - \gamma G H^{-1},$$

where H is the Hessian matrix. This holistic price update makes Newton's method converge quickly, but also makes computing new prices expensive: inverting the Hessian on CPUs is impractical within our approach's time constraints.

The Newton-Like Method.

An approximation to the Newton method was proposed in [S. Athuraliya and S. H. Low. Optimization Flow Control with Newton-like Algorithm. Telecommunication Systems, 15(3-4):345-358, 2000.]. The Newton-like method estimates how sensitive flows are to price changes, by observing how price changes impact network throughput. Prices are then updated accordingly: inversely proportional to the estimate of price-sensitivity. The drawback is that network throughput must be averaged over relatively large time intervals, so estimating the diagonal is slow.

The NED Algorithm.

The key observation in NED that enables its fast convergence is that in the datacenter, it is possible to directly compute how flows on a link will react to a change in that link's price. In other words, NED computes the diagonal of the Hessian, $H_{ll}$, for all links. This eliminates the need to measure the network and in contrast to the full Newton's method can be computed quickly enough on CPUs for sizeable topologies. This results in the update rule:

$$p_l \leftarrow p_l + \gamma G_l H_{ll}^{-1}.$$

We note that the ability to directly compute $H_{ll}$ originates from trust that exists in the datacenter, not the centralization of the allocator.

Algorithm 1 (below) shows our allocation approach using the Newton-Exact-Diagonal (NED) rate allocation algorithm. In our approach, the initialization of prices happens only once, when the system first starts. The allocator starts without any flows having been reported from the endpoints, and link prices are all set to 1. When flows arrive, their initial rates are computed using current prices.

---

Algorithm 1 Single iteration of Newton-Exact-Diagonal

NED updates rates $x = (x_s)$ given prices $p = (p_l)$ ("rate update" step). Then, in the next step of the iteration ("price update"), it uses the updated rates to update the prices.

Rate update. Given prices $p = (p_l)$, for each flow $s \in S$, update the rate:

$$x_s = x_s(p) = (U'_s)^{-1}\left(\sum_{l \in L(s)} p_l\right). \quad (3)$$

For example, if $U_s(x) = w \log x$, then $x_s = \dfrac{w}{\sum_{l \in L(s)} p_l}$.

Price update. Given updated rates $x = x(p) = (x_s(p))$ as described above, update the price of each link $l \in L$:

$$p_l \leftarrow \max(0, p_l - \gamma H_{ll}^{-1} G_l), \quad (4)$$

where $\gamma > 0$ is a fixed algorithm parameter (e.g. $\gamma = 1$), $$G_l = \left(\sum_{s \in S(l)} x_s\right) - c_l, \quad H_{ll} = \sum_{s \in S(l)} \frac{\partial x_s(p)}{\partial p_l}.$$

From (3), $\dfrac{\partial x_s(p)}{\partial p_l} = ((U'_s)^{-1})'\left(\sum_{m \in L(s)} p_m\right).$

---

Choice of Utility Function.

NED admits any utility function $U_s$ that is strictly concave, differentiable, and monotonically increasing. For example, the logarithmic utility function, $U(x) = w \log x$ (for some weight $w > 0$), will optimize weighted proportional fairness [Kelly et al.].

Why Price Duality Works.

The utility function $U_s$ for each $s \in S$ is a strictly concave function and hence the overall objective $\Sigma_s U_s$ in (2) is strictly concave. The constraints in (2) are linear. The capacity of each link is strictly positive and finite. Each flow passes through at least one link, i.e., $L(s) \neq 0$ for each $s \in S$. Therefore, the set of feasible solutions for (2) is non-empty, bounded and convex. The Lagrangian of (2) is $$L(x, p) = \sum_{s \in S} U_s(x_s) - \sum_{\ell \in L} p_\ell \left(\sum_{s \in S(\ell)} x_s - c_\ell\right), \quad (5)$$

with dual variables $p_l$, and the dual function is defined as $$D(p) = \max L(x,p) \text{ over } x_s \geq 0, \text{ for all } s \in S. \quad (6)$$

The dual optimization problem is given by $$\min D(p) \text{ over } p_l \geq 0, \text{ for all } l \in L. \quad (7)$$

From Slater's condition in classical optimization theory, the utility of the solution of (2) is equal to its Lagrangian dual's (7), and given the optimal solution p* of (7) it is possible to find the optimal solution for (2) from (6), i.e., using the rate update step. More details on solving NUM using Lagrange multipliers appear in [F. P. Kelly, A. K. Maulloo, and D. K. Tan. Rate Control for Communication Networks: Shadow prices, Proportional Fairness and Stability. Journal of the Operational Research Society, pages 237-252, 1998, S. Athuraliya and S. H. Low. Optimization Flow Control with Newton-like Algorithm. Telecommunication Systems, 15(3-4):345-358, 2000.].

Rate Normalization

The optimizer works in an online setting: when the set of flows changes, the optimizer does not start afresh, but instead updates the previous prices with the new flow configuration. While the prices re-converge, there are momentary spikes in throughput on some links. Spikes occur because when one link price drops, flows on the link increase their rates and cause higher, over-allocated demand on other links.

Normally, allocating rates above link capacity results in additional queuing in network elements along the flow path. The logically centralized allocator can avoid this additional queuing and its added latency by normalizing allocated rates to link capacities. We propose two schemes for normalization: uniform normalization and flow normalization. For simplicity, the remainder of this section assumes all links are allocated non-zero throughput; it is straightforward to avoid division by zero in the general case.

Uniform Normalization (U-NORM):

U-NORM scales the rates of all flows by a factor such that the most congested link will operate at its capacity. U-NORM first computes for each link the ratio of the link's allocation to its capacity $r_l = \sum_{s \in S(l)} x_s/c_l$. The most over-congested link has the ratio $r^* = \max_{l \in L} r_l$; all flows are scaled using this ratio:

$$\bar{x}_s = \frac{x_s}{r^*}. \quad (8)$$

The benefits of uniform scaling of all flows by the same constant are the scheme's simplicity and that it preserves the relative sizes of flows; for utility functions of the form $w \log x_s$, this preserves the fairness of allocation. However, as shown later, uniform scaling tends to scale down flows too much, reducing total network throughput.

Flow Normalization (F-NORM):

As shown in Algorithm 2, below, Per-flow normalization scales each flow by the factor of its most congested link. This scales down all flows passing through a link l by at least a factor of $r_l$, which guarantees the rates through the link are at most the link capacity. Formally, F-NORM sets $$\bar{x}_s = \frac{x_s}{\max_{l \in L(s)} r_l}. \quad (9)$$

F-NORM requires per-flow work to calculate normalization factors, and does not preserve relative flow rates, but a few over-allocated links do not hurt the entire network's throughput. Instead, only the flows traversing the congested links are scaled down.

We note that the normalization of flow rates follows a similar structure to NED but instead of prices, the algorithm computes normalization factors. This allows F-NORM to reuse the multi-core design of NED, as described later.

---

Algorithm 2 F-NORM

Compute normalized flow rates $\bar{x}_s$ given prices $p_l$:
(A) Update flow prices $p_s$ from link prices $p_l$ $$p_s = \sum_{l \in L(s)} p_l \text{ for all } s \in S$$

(B) Compute each flow's rate $x_s$
$x_s = x_s(p_s)$ for all $s \in S$
(C) Find each link's congestion ratio $r_l$ $$r_l = \frac{\sum_{s \in S(l)} x_s}{c_l} \text{ for all } l \in L$$

(D) Normalize flow rates $$\bar{x}_s = \frac{x_s}{\max_{l \in L(s)} r_l} \text{ for all } s \in S$$

---

Implementation

Here we describe a particular implementation of the allocation approach discussed earlier, although a wide variety of other implementations would also be possible.

The approach that we have described can be implemented using a client side (endpoint) module and a logically centralized allocator module.

Server Module.

The client side is implemented using a kernel module, requiring no modification to applications running on the endpoint. The client side module at each of the endpoints reports to the logically centralized allocator when socket buffers at the endpoint transition between empty and non-empty. The client side module also enforces the allocated rates by delaying packets when the rate limit is exceeded. In some implementations, the client side module could also change TCP slow-start and loss/marking behavior Protocol.

In some implementations, the communication protocol between the client-side modules and the logically central allocator module is used over a variant of the Fastpass Control Protocol (FCP) for transport. The communication protocol allows endpoints to process payloads out-of-order, so a dropped client-to-allocator packet does not increase latency for non-dropped packets. The communication protocol synchronizes state between the allocator and endpoints; when reacting to loss of packets between the clients and allocator, instead of retransmitting old state, participants send the most recent state, and that only if the acknowledged state differs.

Allocator.

In some instances, the allocator is written in C++ and runs on a central server or servers from which it accesses NIC queues on the allocator servers. The NIC and its queues are used to send control packets from the allocator to clients at the endpoints directly using the DPDK (Data Plane Development Kit) library. A hash table at the allocator maps endpoints to their flow states, which the communication protocol maintains in synchronization with the endpoints. We use the phrase "flow state" broadly to include, for example, any aspect of the condition or characteristics or properties of the flow, including, for example, the source and destination of the flow (including address and port number), the protocol of the flow, and the rate allocated to the flow. The flow state can include other properties on which the allocation is based, for example, the identity of the application that started the flow, the identity of the user who started the application, the CPU load generated by the application, what files are open, the read and write throughputs in aggregate or to each individual file, the amount of memory used, among others. When allocated flow rates differ from the allocations acknowledged by the endpoints, the allocator triggers rate update messages to the endpoints.
Parallelizing the Allocator.

The allocator scales by working on multiple cores on one or more server machines. Implementations can be designed to optimize 2-stage Clos networks such as a Facebook fabric pod [A. Andreyev. Introducing data center fabric, the next-generation Facebook data center network.] or a Google Jupiter aggregation block [A. Singh, J. Ong, A. Agarwal, G. Anderson, A. Armistead, R. Bannon, S. Boving, G. Desai, B. Felderman, P. Germano, A. Kanagala, J. Provost, J. Simmons, E. Tanda, J. Wanderer, U. Hölzle, S. Stuart, and A. Vandat. Jupiter rising: A decade of clos topologies and centralized control in google's datacenter network. In Proceedings of the 2015 ACM Conference on Special Interest Group on Data Communication, SIGCOMM '15, pages 183-197, New York, N.Y., USA, 2015. ACM.], the latter consisting of 6,144 servers in 128 racks. We believe the techniques could be generalized to 3-stage topologies.
On a Single Multi-Core Machine.

A strawman multiprocessor algorithm, which arbitrarily distributes flows for allocation processing to different processors, will perform poorly because NED uses flow state to update link state when it computes aggregate link rates from flow rates: updates to a link from flows being processed on different processors will cause significant cache-coherence traffic, slowing down the computation.

Now consider an algorithm that distributes allocation processing for flows to processors based on source rack (e.g., the rack holding an endpoint device that is the source of a flow). This algorithm is still likely to be sub-optimal: flows from many source racks can all cause updating of links to the same destination, again resulting in expensive coherence traffic. However, this source rack grouping has the property that all updates to links connecting endpoint servers→ToR (top of rack) switches and ToR→aggregation switches (i.e., going up the network topology) are only performed by the processor responsible for the source rack. A similar grouping by destination rack has locality in links going down the topology. This observation can be used in some multiprocessor implementations of our approach.

FIGS. 2, 3, and 4 show the partitioning of network state (flows and links) into FlowBlocks 50 and LinkBlocks 52. Groups of network racks form blocks (two racks per block in the figure). All links 54 going upwards from a group of racks that constitute a block 58 form an upward LinkBlock 60 (FIG. 2), and all links 62 going downward towards a set of racks 64 that form a block 66 form a downward Link-Block 68 (FIG. 3). As shown in FIG. 4, flows are partitioned for allocator processing by both their source 70 and destination 72 blocks into FlowBlocks 50. This partitioning reduces concurrent updates, but does not eliminate them, as each upward LinkBlock 76 is still updated by all Flow-Blocks 50 in the same source block. Similarly, downward LinkBlocks 52 are updated by all FlowBlocks in the same destination block, for example, downward LinkBlock 77 is updated by all of the FlowBlocks in column 79.
Aggregation.

To eliminate concurrent updates completely, the processing for each FlowBlock can use private, local copies of its upward and downward LinkBlocks. The local copies are then aggregated into global copies. The algorithm then proceeds to update link prices on the global copies, and distributes the results back to FlowBlocks, so they again have local copies of the prices. Distribution follows the reverse of the aggregation pattern.

Figure 5A:
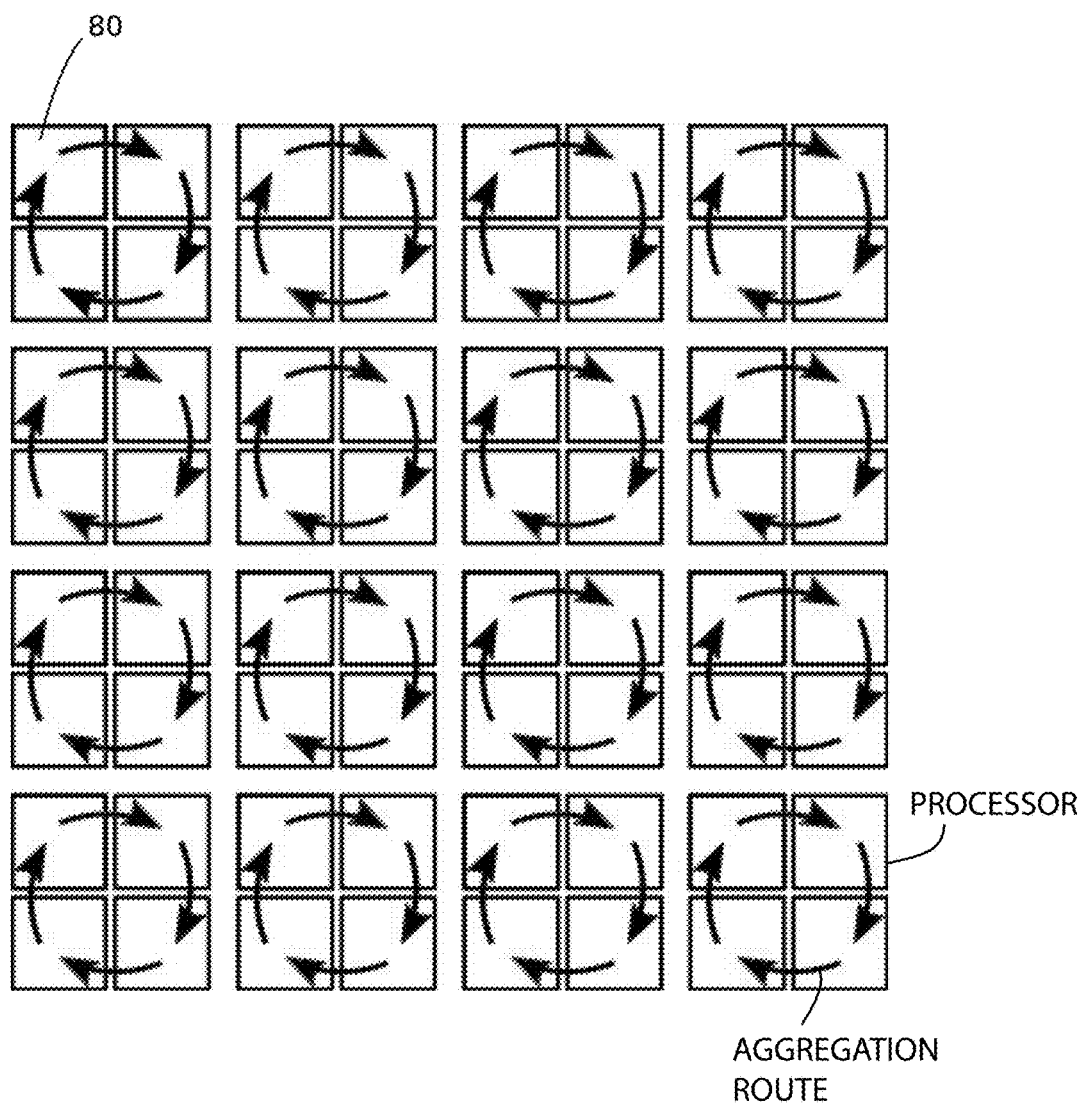
Figure 5B:
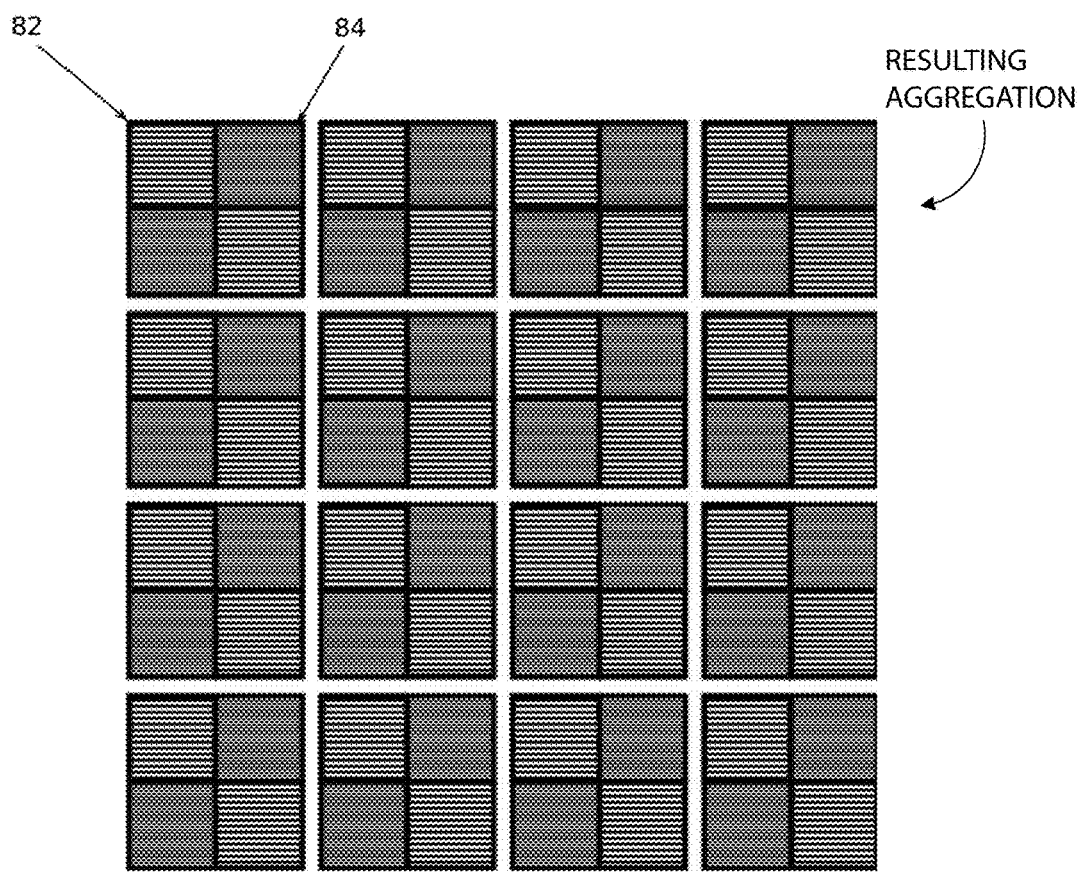
Figure 6A:
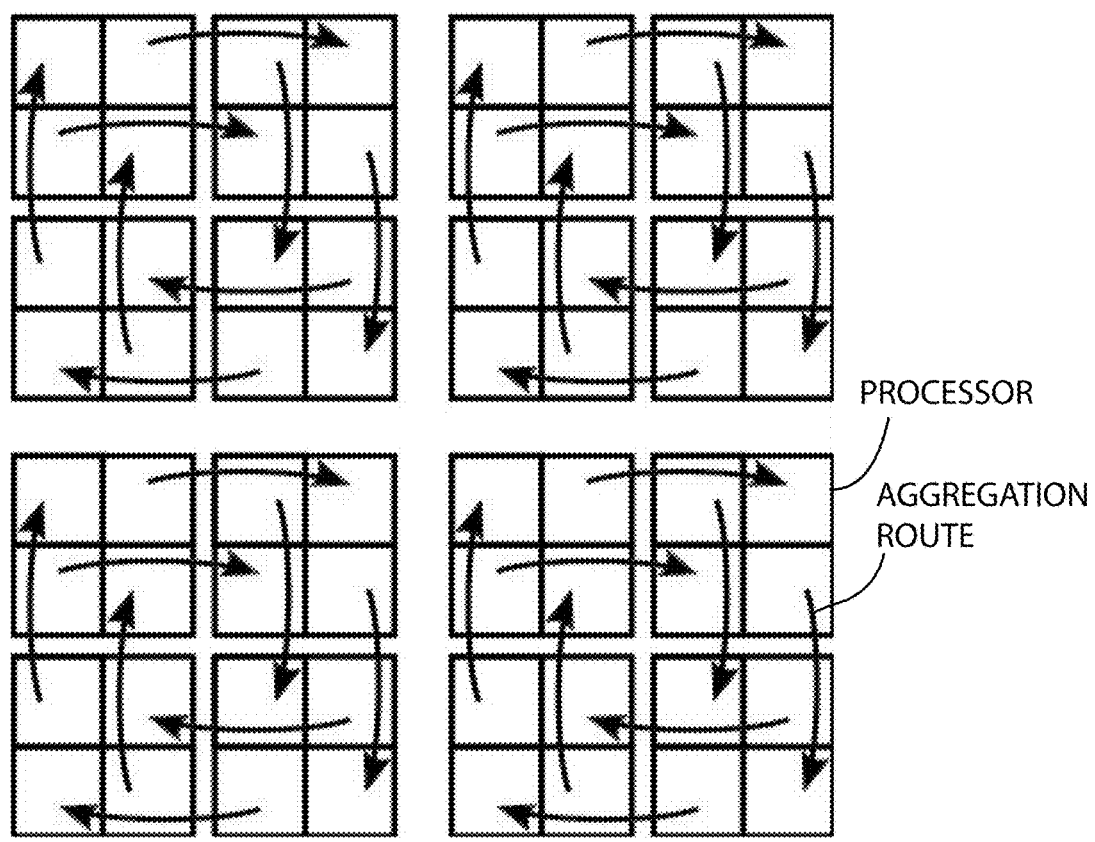
Figure 6B:
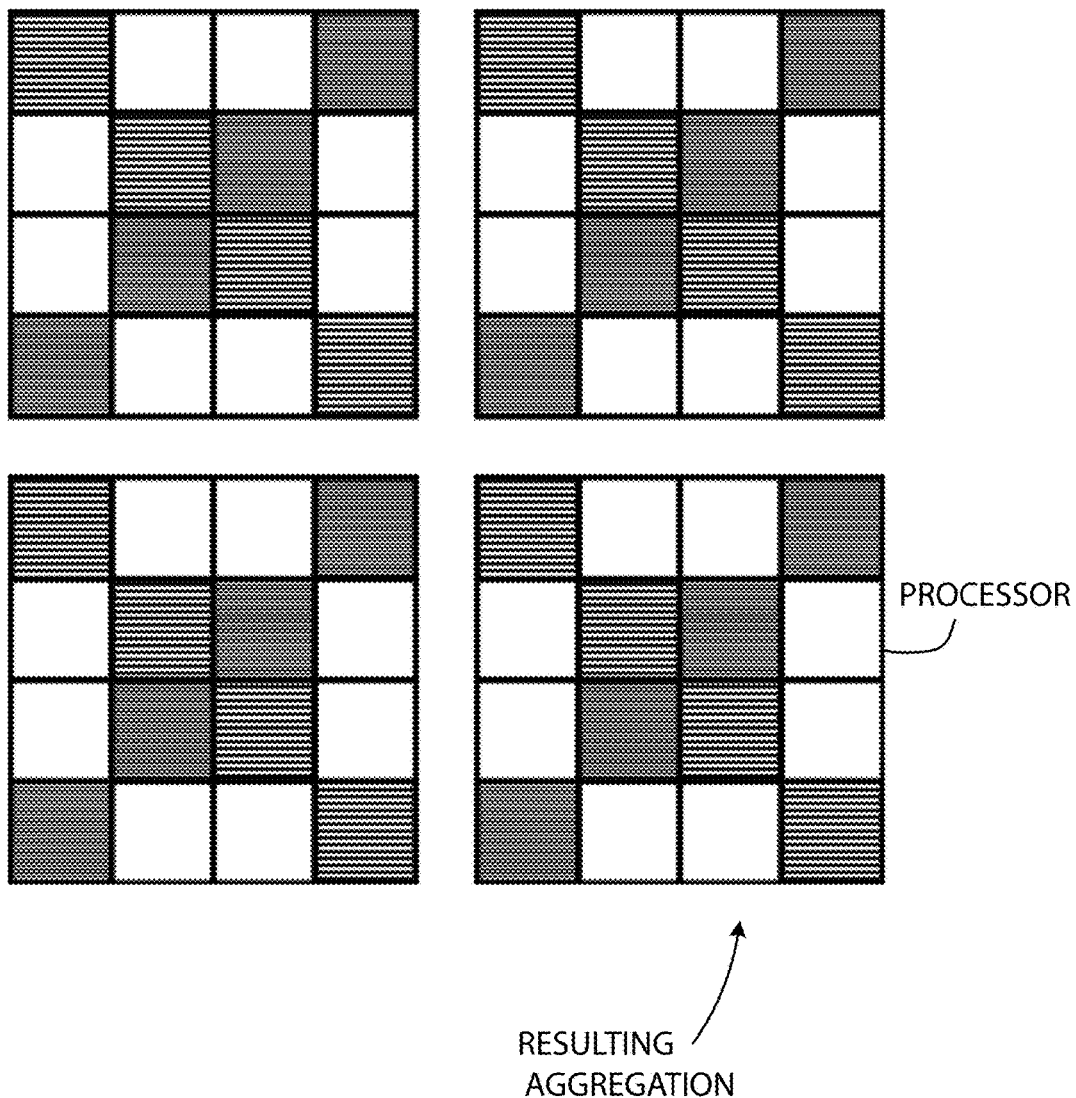

FIGS. 5A, 5B, 6A, 6B, and 7A and 7B show three steps in the LinkBlock aggregation pattern for a 64-processor allocator. Each aggregation step m combines LinkBlocks within each $2m \times 2m$ group of processes to the group diagonals, with the main diagonal aggregating upward LinkBlocks, and the secondary diagonal downward LinkBlocks. FIGS. 5A and 5B are for the step m=1; FIGS. 6A and 6B for m=2; and FIGS. 7A and 7B for m=3. The A portion of each figure illustrates the aggregation "route" and the B portion shows the resulting aggregation. The aggregation scheme scales well with the number of cores. $n^2$ processors require only $\log_2 n$ steps rather than $\log_2 n^2$—the number of steps increases only every quadrupling of processors.

The aggregation pattern has uniform bandwidth requirements: when aggregating $2m \times 2m$ processors, each $m \times m$ sub-group sends and receives the same amount of Link-Blocks state to/from its neighbor sub-groups. Unlike Flow-Blocks, whose size depends on the traffic pattern, each LinkBlock contains exactly the same number of links, making transfer latency more predictable.

Sending LinkBlocks is also much cheaper than sending FlowBlocks: datacenter measurements show average flow count per server at tens to hundreds of flows, while Link-Blocks have a small constant number of links per server (usually between one and three).
Multi-Machine Allocator.

The LinkBlock-FlowBlock partitioning distributes the allocation processing to multiple machines. For example, FIGS. 5A, 5B, 6A, 6B, and 7A and 7B show a setup with four machines with 16 cores each. In steps (a) and (b) (FIGS. 5A, 5B, 6A, 6B), each machine aggregates LinkBlocks internally, then in step (c), aggregation is performed across machines; each machine receives from one machine and sends to another. This arrangement scales to any $2^m \times 2^m$ collection of machines.

The FlowBlock/LinkBlock partitioning still works when parallelizing the allocator across multiple machines. However for cases where crossing machine boundaries incurs significantly more latency than crossing between cores of the same machine, we propose an aggregation scheme across machine boundaries—one where aggregation happens in a single step rather than $\log_2 n$ steps (for $n^2$ machines).

Figure 8A:
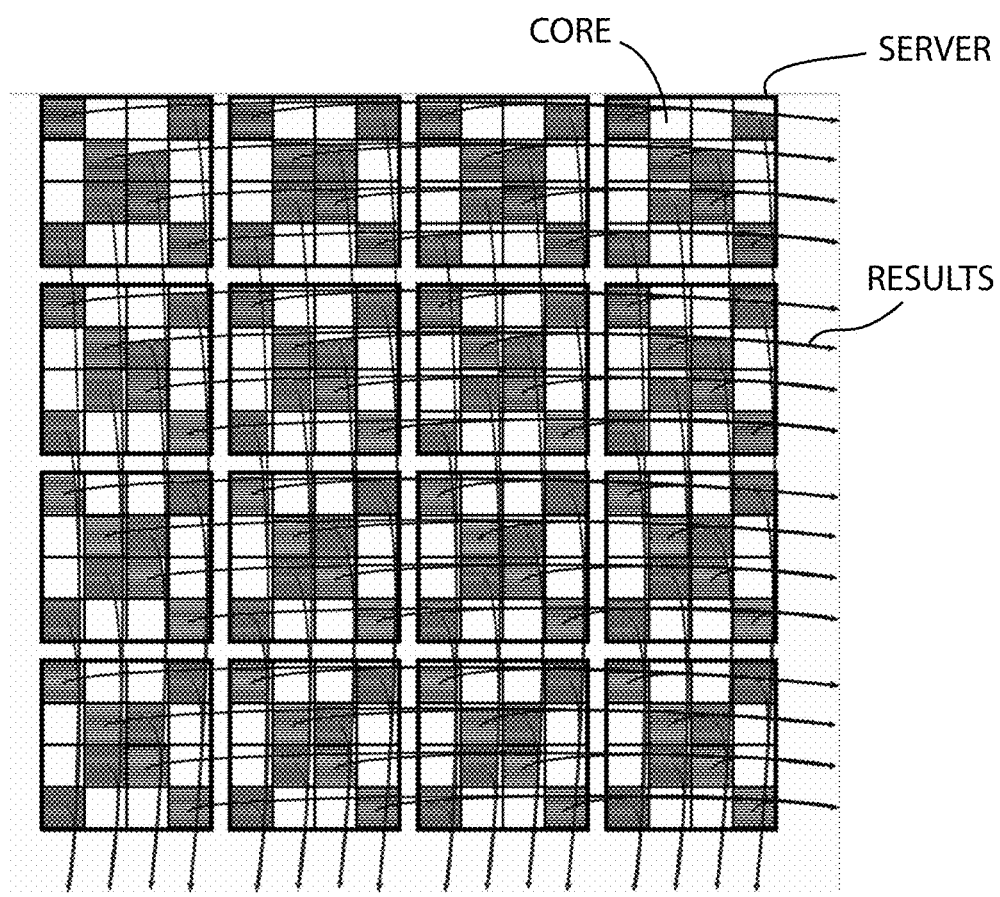

In this aggregation scheme, each row and each column are each shipped to an aggregator, which aggregates the blocks and returns the results back to the sources (FIG. 8A, an example involving 16 servers and 16 cores).

Figure 8B:
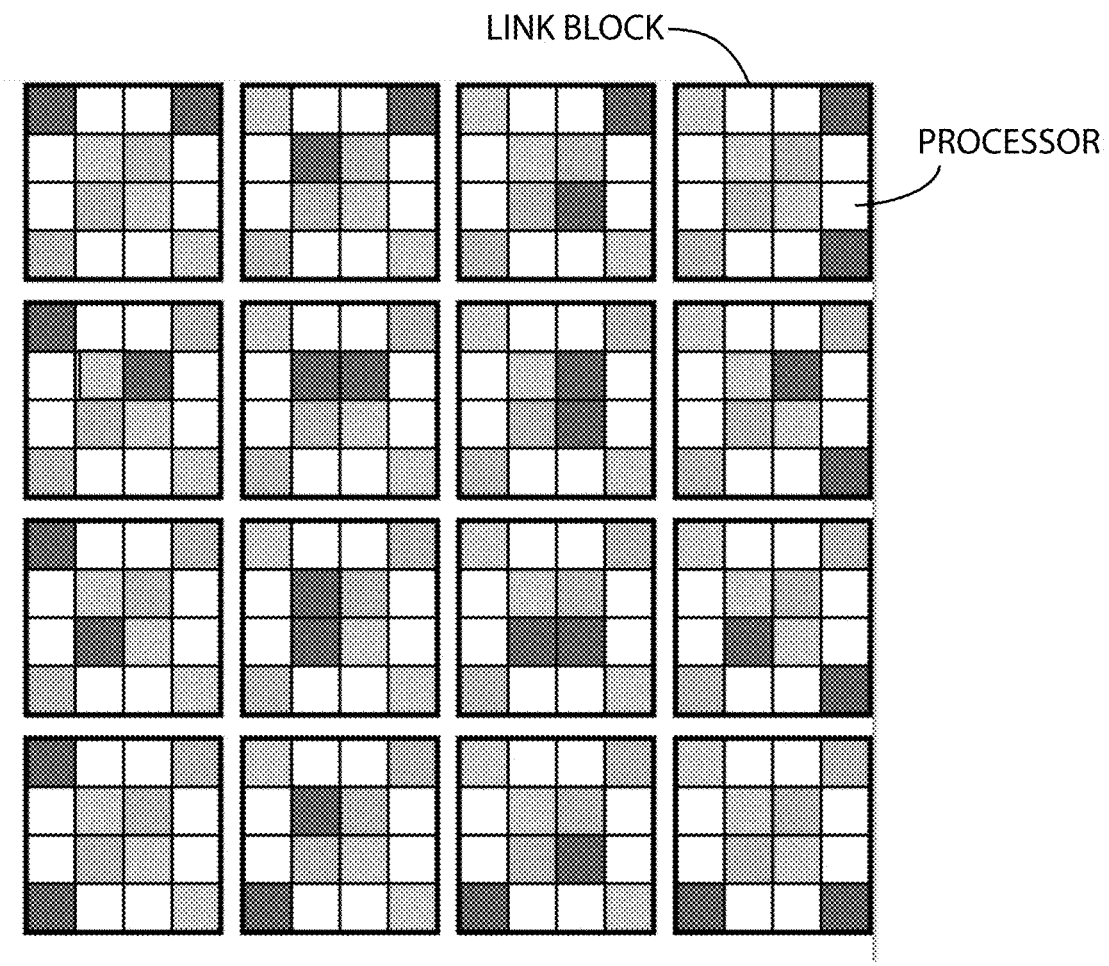

Further, it is possible to save on communication with a specific assignment of allocators to servers: for example if the server in row i and column j aggregates the $i^{th}$ downward LinkBlock and $j^{th}$ upward LinkBlock from its diagonals (for every i and j) such as in FIG. 8B (right), then each server transmits six and receives six LinkBlocks (three upward, three downward).
Path Discovery In our approach the allocator knows each flow's path through the underlying network. Many common architectures support this requirement:
ECMP.

Given the ECMP hash function and switch failure notifications, the allocator directly computes flow paths.
Software-Defined Networks.

The SDN controller informs the allocator of its routing decisions.

Tunneling, e.g., GRE/IP-in-IP (like VL2). Endpoints tunnel packets to a core switch for forwarding to the destination. Endpoints would inform the allocator of the path.

MPLS-Based.

The allocator subscribes to the MPLS configuration stream and computes paths. For other cases, a kernel module can discover the path of a TCP flow. The path computing module, in general, does not have to be in the kernel; with some support from the operating system, the module can be situated in user space. The module uses ICMP Time Exceeded messages like traceroute, with the additional capability of tracing live flows without disturbing the flows. Unfortunately, however, switches frequently rate-limit their ICMP processing, which limits the approach to tracing only large flows ("elephants"). In such a setting, implementations of our approach might be implemented to only schedule elephants and leave enough headroom for the mice.

Our path discovery sends specially-crafted TCP packets to find a flow's path, and like traceroute, finds routers k hops away by setting the TTL field (Hop Count in IPv6) to k, and handling ICMP Time Exceeded messages.

Unlike existing traceroute variants, however, our path discovery supports existing, live flows: the arrival of probe packets to the remote endpoint and of returning ICMP messages to the originator endpoint must not disrupt existing connections.

Implementations of our approach adhere to these requirements.

The probe originator observes the returned ICMP Time Exceeded messages. RFC1122 section 4.2.3.9 mandates "TCP MUST act on an ICMP error message passed up from the IP layer, directing it to the connection that created the error", and that the implementation must report ICMP errors to the application. This means that unless properly handled, the returning Time Exceeded messages could cause error messages to the applications that would otherwise have not existed.

Our path probes leverage a check that network stacks perform: incoming ICMP messages for TCP packets with out-of-window sequence numbers are discarded. RFC5927 section 4.1 documents this behavior in Linux, OpenBSD, FreeBSD and NetBSD, motivated by making it harder for an attacker to break TCP connections by sending fake ICMP messages.

Implementations of our approach set the probe SEQ to a number in the range [SEQ.UNA-1024, SEQ.UNA).

Like in TCP Keep-Alives, (RFC1122 4.2.3.6), out-of-window SEQs would prevent error messages, but usually generate an ACK, which might cause a Fast Retransmit. Implementations of our allocation approach can deliberately mutilate the TCP checksum so if the remote endpoint ever receives a probe packet, it will drop it without terminating the connection or notifying the application. Linux, for example, only increments TCP_MIB_CSUMERRORS.

Implementation.

Path discovery can be implemented as a Linux kernel module. The module exposes an API that allows other kernel components to find the path packets of a given socket take. This API consists of a single function, probe_add( ) used to send probes. The caller passes the queried socket, a TTL value, and a callback function, and the module then sends out a probe packet. When an ICMP Time Exceeded message arrives, the module calls the callback that was passed when the probe was initiated.

A simple and portable method to intercept ICMP packets is to open an in-kernel raw socket. The kernel performs extra work to deliver packets to the kernel module only in case of ICMP packets, and the raw socket has a filter that the module configures to intercept only Time Exceeded messages.

Some implementations can support multiple live queries on a socket by choosing different SEQs for different probes, so users can find an entire path quickly by issuing all queries in parallel. The module finds which probe an ICMP message belongs to matching with the ICMP payload's SEQ.

ICMP packets return the IP header plus 8 bytes of the offending packet. TCP uses these 8 bytes for the source and destination ports and the sequence number, hence the module is able to know which ICMP message belongs to which probe.

Evaluation

We evaluated our Flowtune implementation using a cluster deployment, benchmarks, and simulation. First, we present experiments on Amazon EC2 to compare the performance of Linux's TCP implementation with and without our allocator on physical hardware. Then, we present benchmarks that measure the allocator's latency as a function of network size and the number of available cores, showing how the system scales. Finally, we use simulations to evaluate the system's overhead and convergence speed, and the emergent p99 FCT, packet drops, queueing delay, and fairness. Simulation allows comparison with schemes whose implementations are only readily available in the ns-2 simulator: pFabric, sfqCoDel, and XCP. The following table summarizes the experimental results.

(A) On Amazon EC2, the allocator's sharing of available throughput is more fair than the baseline Linux implementation running Cubic.
(B) The allocator makes transfers on EC2 more predictable: Many-to-One Coflow Completion Time decreased by 1.61x in p95 and 1.24x in p90.
(C) A multi-core implementation optimizes traffic from 384 servers on 4 cores in 8.29 μs. 64 cores schedule 4608 servers' traffic in 30.71 μs - around 2 network RTTs.
(D) The allocator converges quickly to a fair allocation within 100 μs, orders of magnitude faster than other schemes.
(E) The amount of traffic to and from the allocator depends on the workload; it is <0.17%, 0.57%, and 1.13% of network capacity for the Hadoop, cache, and web workloads.
(F) Rate update traffic can be reduced by 69%, 64%, and 33% when allocating 0.95 of link capacities on the Hadoop, cache, and web workloads.
(G) As the network size increases, allocator traffic takes the same fraction of network capacity.
(H) The allocator achieves low p99 flow completion time: 8.6x-10.9x and 1.7x-2.4x lower than DCTCP and pFabric on 1-packet flowlets, and
3.5x-3.8x than sfqCoDel on 10-100 packets.
(I) The allocator keeps p99 network queuing delay under 8.9 μs, 12x less than DCTCP.
(J) The allocator maintains a negligible rate of drops. sfqCoDel drops up to 8% of bytes, pFabric 6%.
(K) Normalization is important; without it, NED over-allocates links by up to 140 Gbits/s.
(L) F-NORM achieves over 99.7% of optimal throughput. U-NORM is not competitive.

Amazon EC2 Deployment

We deployed the allocator on 10 Amazon EC2 c4.8× large instances running Ubuntu 16.04 with 4.4.0 Linux kernels. One of the instances ran the allocator and had direct access to the NIC queues using SR-IOV. The other instances ran the workload.

The experiment harness achieves accurate workload timing by measuring the clock offset of each instance using ntpdate. Before starting/stopping the workload, processes on the measured instances call nanosleep with appropriate amounts to compensate.

Fairness.

Figures 9, 10:
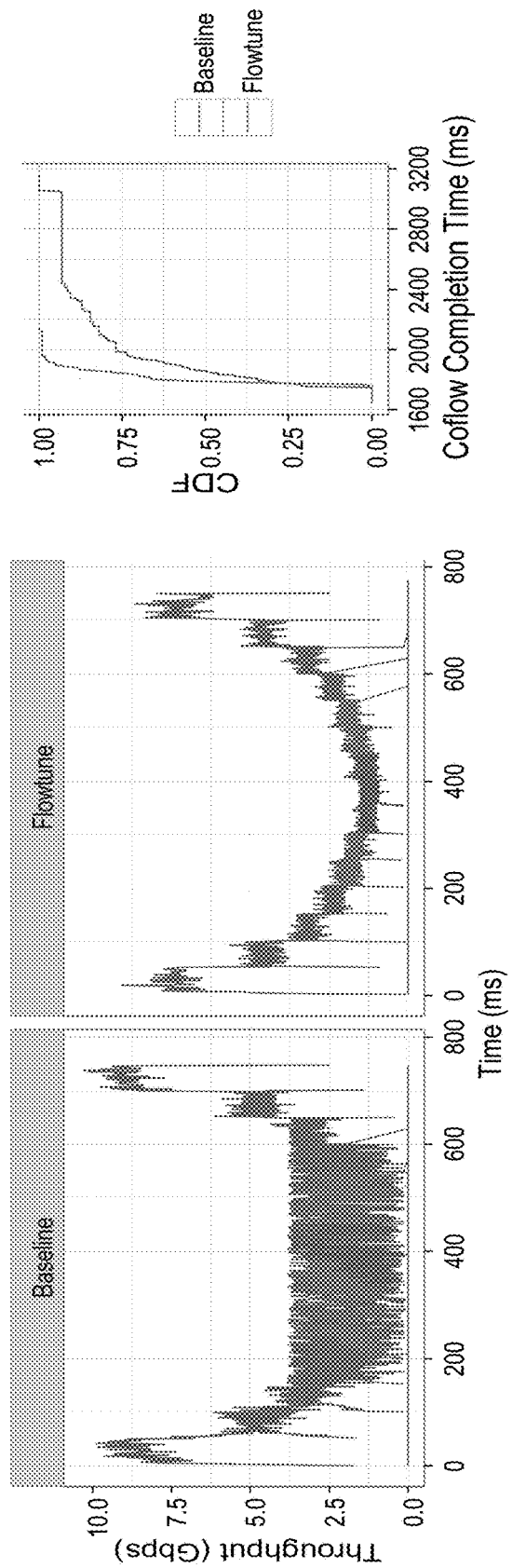

In an 8-to-1 experiment, eight senders start every 50 ms in sequence and then finish similarly. FIG. 9 shows the rates of each flow as the experiment progresses. The allocator shares the throughput much more fairly than the baseline: the rates of the different flows overlap at equal division of throughput. The baseline rates oscillate, even with only 3 competing flows.

Coflow Completion Time.

Here, 8 senders each make 25 parallel transfers of 10 Mbytes to a single receiver. This transfer pattern models Spark aggregating data from worker cores, or a slice of a larger MapReduce shuffle stage. FIG. 10 shows results from 100 runs with the allocator vs. the baseline. The allocator achieves more predictable results and is generally faster. The reduction in different percentiles are summarized in the following table.

| Metric | Baseline | Allocator | Speedup |
| --- | --- | --- | --- |
| median | 1.859249 | 1.787622 | 1.04× |
| p90 | 2.341086 | 1.881433 | 1.24× |
| p95 | 3.050718 | 1.894544 | 1.61× |

Multicore Implementation

We benchmarked NED's multi-core implementation on a machine with 8 Intel E7-8870 CPUs, each with 10 physical cores running at 2.4 GHz. We divided the network into 2, 4 and 8 blocks, giving runs with 4, 16, and 64 FlowBlocks. In the 4-core run, we mapped all FlowBlocks to the same CPU. With higher number of cores, we divided all FlowBlocks into groups of 2-by-2, and put two adjacent groups on each CPU.

The following table shows the number of cycles taken for different choices of network sizes and loads:

| Cores | Nodes | Flows | Cycles | Time |
| --- | --- | --- | --- | --- |
| 4 | 384 | 3072 | 19896.6 | 8.29 μs |
| 16 | 768 | 6144 | 21267.8 | 8.86 μs |
| 64 | 1536 | 12288 | 30317.6 | 12.63 μs |
| 64 | 1536 | 24576 | 33576.2 | 13.99 μs |
| 64 | 1536 | 49152 | 40628.5 | 16.93 μs |
| 64 | 3072 | 49152 | 57035.9 | 23.76 μs |
| 64 | 4608 | 49152 | 73703.2 | 30.71 μs |

Rows 1-3 show run-times with increasing number of cores, rows 3-5 with increasing number of flows, and rows 5-7 with increasing number of endpoints. These results show general-purpose CPUs are able to optimize network allocations on hundreds of nodes within microseconds.

Rate allocation for 49K flows from 4608 endpoints takes 30.71 μs, around 2 network RTTs, or 3 RTTs considering an RTT for control messages to obtain the rate. TCP takes tens of RTTs to converge—significantly slower.

Communication between CPUs in the aggregate and distribute steps took more than half of the runtime in all experiments, e.g., 20 μs with 4068 nodes. This result implies it should be straightforward to perform the aggregate and distribute steps on multiple servers in a cluster using commodity hardware and kernel-bypass libraries.

Throughput Scaling and Comparison to Fastpass.

Our aggregator scales to larger networks than Fastpass, which reported 2.2 Tbits/s on 8 cores. Fastpass performs per-packet work, so its scalability declines with increases in link speed. Our aggregator schedules flowlets, so allocated rates scale proportionally with the network links. The benchmark results above show that on 40 Gbits/s links, 4 cores allocate 15.36 Tbits/s, and 64 cores allocate 184 Tbits/s on 64 cores in under 31 μs, 10.4× more throughput per core on 8× more cores—an 83× throughput increase over Fastpass.

Simulation Setup

Model.

All allocator traffic shares the network with data traffic and experiences queuing and packet drops. Allocator payloads are transmitted using TCP, and are only processed after all payload bytes arrive at their destinations.

Topology.

The topology is a two-tier full-bisection topology with 4 spine switches connected to 9 racks of 16 servers (we sometimes refer to the devices at the endpoints of the network as servers) each, where servers are connected with a 10 Gbits/s link. It is the same topology used in [M. Alizadeh, S. Yang, M. Sharif, S. Katti, N. McKeown, B. Prabhakar, and S. Shenker. pFabric: Minimal near-optimal datacenter transport. In Proceedings of the ACM SIGCOMM 2013 conference on SIGCOMM, pages 435-446. ACM, 2013.]. Links and servers have 1.5 and 2 microsecond delays respectively, for a total of 14 μs 2-hop RTT and 22 μs 4-hop RTT, commensurate with measurements we conducted in a large datacenter.

Workload.

To model micro-bursts, flowlets are modeled to follow a Poisson arrival process. Flowlet size distributions are according to the Web, Cache, and Hadoop workloads published by Facebook [A. Roy, H. Zeng, J. Bagga, G. Porter, and A. C. Snoeren. Inside the social network's (datacenter) network. In Proceedings of the 2015 ACM Conference on Special Interest Group on Data Communication, SIGCOMM '15, pages 123-137, New York, N.Y., USA, 2015. ACM.]. The Poisson rate at which flows enter the system is chosen to reach a specific average server load, where 100% load is when the rate equals server link capacity divided by the mean flow size. Unless otherwise specified, our experiments use the Web workload, which has the highest rate of changes and hence stresses the allocator the most among the three workloads. Sources and destinations are chosen uniformly at random.

Servers.

When opening a new connection, a server starts a regular TCP connection and in parallel sends a notification to the allocator. Whenever a server receives a rate update for a flow from the allocator, it opens the flow's TCP window and paces packets on that flow according to the allocated rate.

Allocator.

The allocator performs an iteration every 10 μs. We found that for NED parameter γ in the range [0.2, 1.5], the network exhibits similar performance; experiments have γ=0.4.

Allocator Connections.

The allocator is connected using a 40 Gbits/s link to each of the spine switches. Allocator—server communication uses TCP with a 20 μs minRTO and 30 μs maxRTO.

Notifications of flowlet start, end, and rate updates are encoded in 16, 4, and 6 bytes respectively plus the standard TCP/IP overheads. Updates to the allocator and servers are only applied when the corresponding bytes arrive, as in ns2's TcpApp.

Fast Convergence

To show how fast the different schemes converge to a fair allocation, we ran five senders and one receiver. Starting with an empty network, every 10 ms one of the senders would start a flow to the receiver. Thereafter, every 10 ms one of the senders stops.

Figure 11:
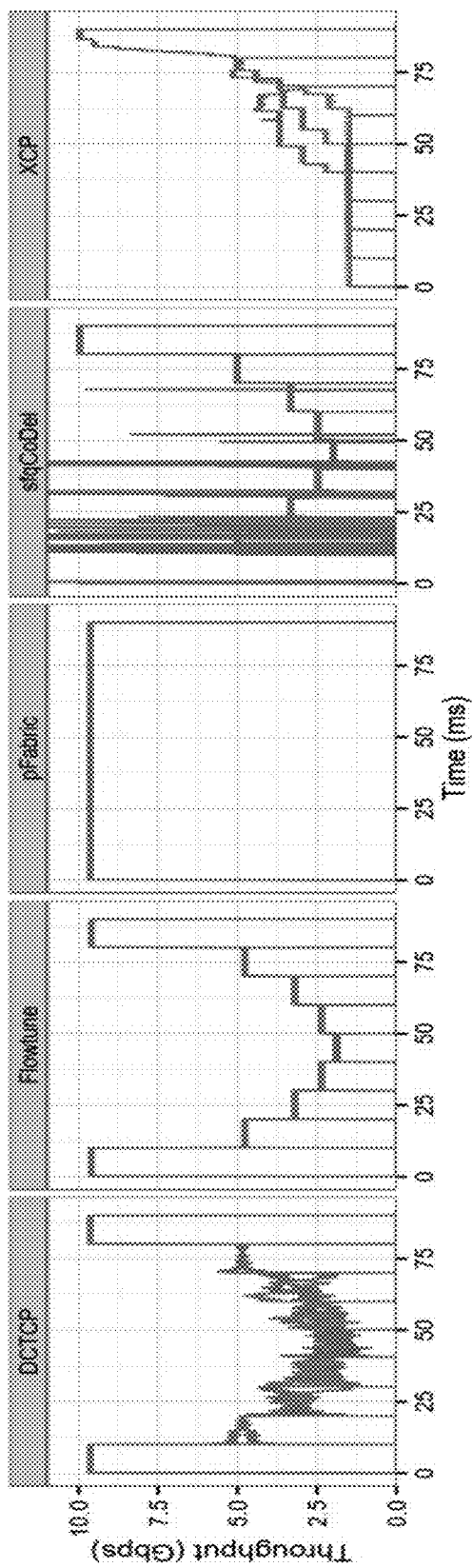

FIG. 11 shows the rates of each of the flows as a function of time. Throughput is computed at 100 µs intervals; smaller intervals make very noisy results for most schemes. The allocator achieves an ideal sharing between flows: N flows each get 1/N of bandwidth quickly (within 20 µs, not shown in the figure). DCTCP takes several milliseconds to approach the fair allocation, and even then traffic allocations fluctuate. pFabric doesn't share fairly; it prioritizes the flow with least remaining bytes and starves the other flows. sfqCoDel reaches a fair allocation quickly, but packet drops cause the application-observed throughput to be extremely bursty: the application sometime receives nothing for a while, then a large amount of data when holes in the window are successfully received. XCP is slow to allocate bandwidth, which results in low throughputs during most of the experiment.

Rate-Update Traffic

The allocator only changes allocations on flowlet start and stop events, so when these events are relatively infrequent, the allocator could send relatively few updates every second. On the other hand, since the allocator optimizes utility across the entire network, a change to a single flow could potentially change the rates of all flows in the network. This section explores how much traffic to and from the allocator is generated.

In some implementations, the allocator notifies servers when the rates assigned to flows change by a factor larger than a threshold. For example, with a threshold of 0.01, a flow allocated 1 Gbit/s will only be notified when its rate changes to a rate above 1.01 or below 0.99 Gbits/s. To make sure links are not over-utilized, the allocator adjusts the available link capacities by the threshold; with a 0.01 threshold, the allocator would allocate 99% of link capacities.

Amount of Update Traffic.

Figure 12:
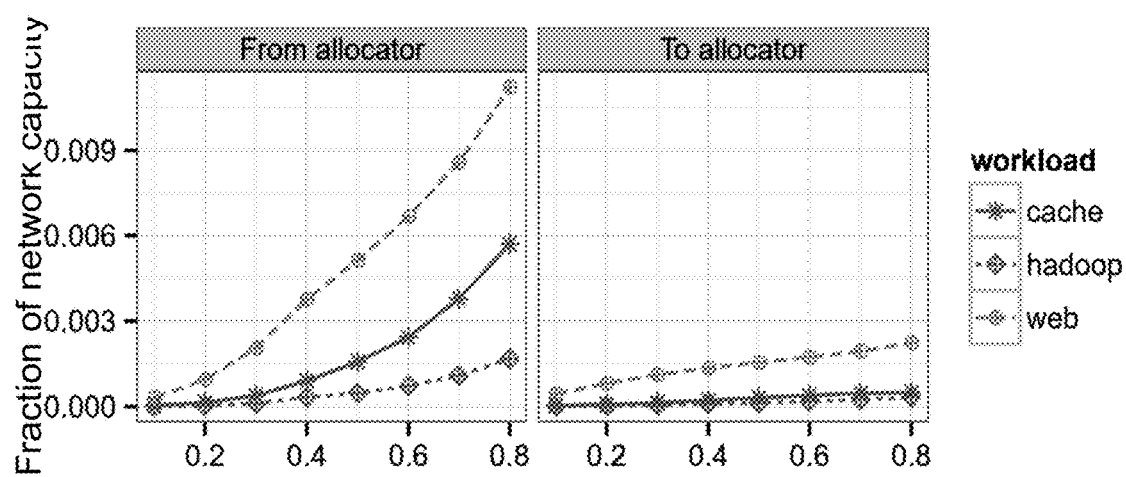

FIG. 12 shows the amount of traffic sent to and from the allocator as a fraction of total network capacity, with a notification threshold of 0.01. The Web workload, which has the smallest mean flow size, also incurs the most update traffic: 1.13% of network capacity. At 0.8 load, the network will be 80% utilized, with 20% unused, so update traffic is well below the available headroom. Hadoop and Cache workloads need even less update traffic: 0.17% and 0.57%.

Traffic from servers to the allocator is substantially lower than from the allocator to servers: servers only communicate flowlet arrival and departures, while the allocator can potentially send many updates per flowlet.

Reducing Update Traffic.

Figure 13:
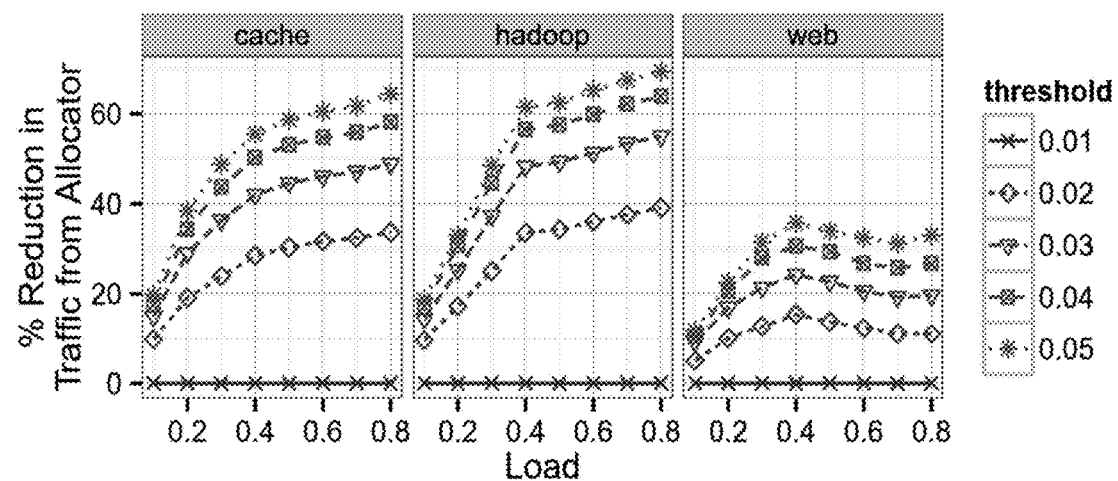

Increasing the update threshold reduces the volume of update traffic and the processing required at servers. FIG. 13 shows the measured reduction in update traffic for different thresholds compared to the 0.01 threshold in FIG. 12. Notifying servers of changes of 0.05 or more of previous allocations saves up to 69%, 64% and 33% of update traffic for the Hadoop, Cache, and Web workloads.

Effect of Network Size on Update Traffic.

Figure 14:
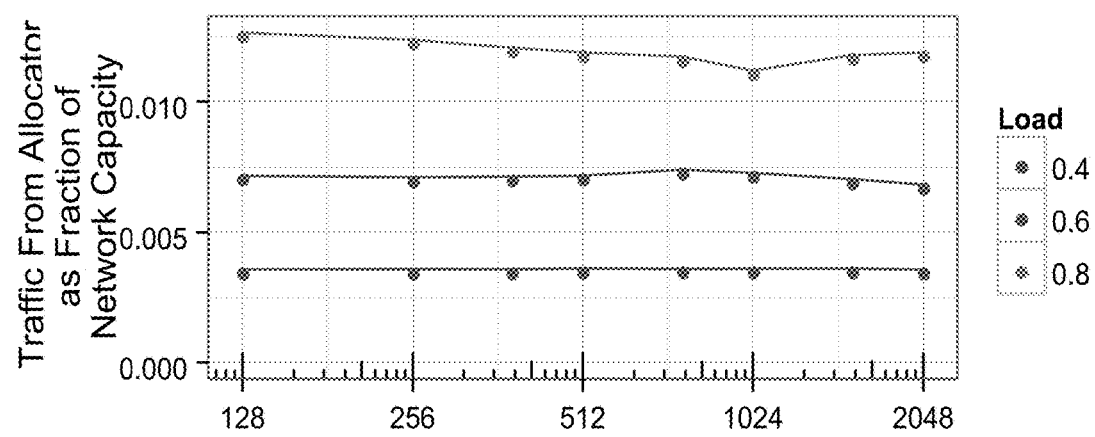

An addition or removal of a flow in one part of the network potentially changes allocations on the entire network. As the network grows, does update traffic also grow, or are updates contained? FIG. 14 shows that as the network grows from 128 servers up to 2048 servers, update traffic takes the same fraction of network capacity—there is no debilitating cascading of updates that increases update traffic. This result shows that the threshold is effective at limiting the cascading of updates to the entire network.

Comparison to Prior Schemes

We compare our allocator to DCTCP, pFabric, XCP, and Cubic+sfqCoDel.

$99^{th}$ percentile FCT. For datacenters to provide faster, more predictable service, tail latencies must be controlled. Further, when a user request must gather results from tens or hundreds of servers, p99 server latency quickly dominates user experience.

Figure 15:
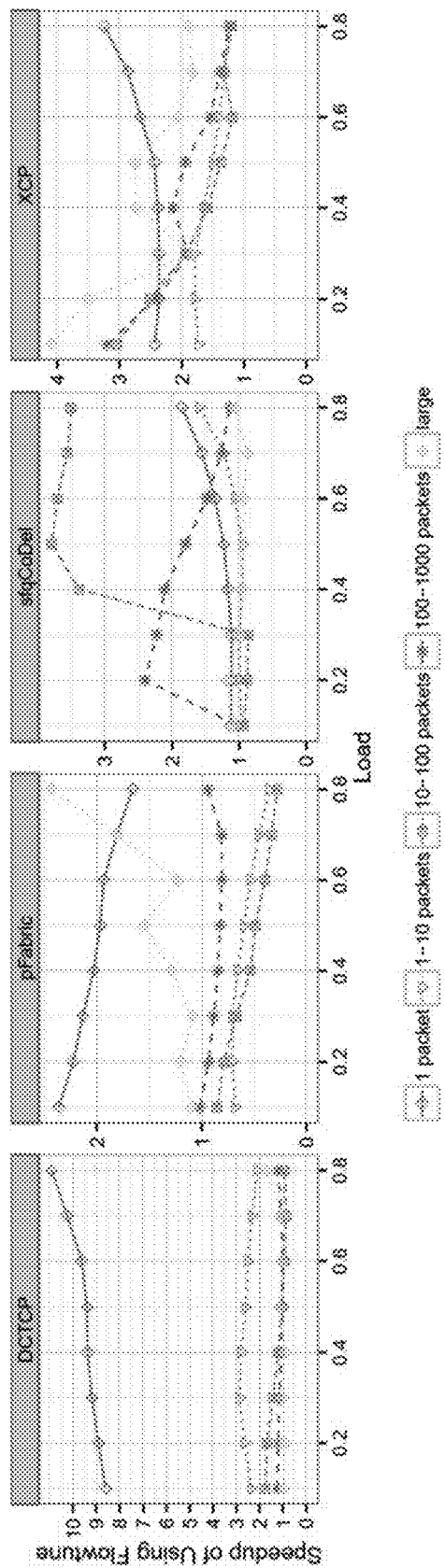

FIG. 15 shows the improvement in $99^{th}$ percentile flow completion time achieved by switching from other schemes to our allocator. To summarize flows of different lengths to the different size ranges ("1-10 packets", etc.), we normalize each flow's completion time by the time it would take to send out and receive all its bytes on an empty network.

Our allocator performs better than DCTCP on short flows: 8.6×-10.9× lower p99 FCT on 1-packet flows and 2.1×-2.9× on 1-10 packet flows. This happens because DCTCP has high p99 queuing delay, as shown in the next experiment.

Overall, pFabric and the allocator have comparable performance, with the allocator better on some flow sizes, pFabric on others. Note, however, that the allocator achieves this performance without requiring any changes to networking hardware. The allocator achieves 1.7×-2.4× lower p99 FCT on 1-packet flows, and up to 2.4× on large flows. pFabric performs well on flows 1-100 packets long, with similar ratios. pFabric is designed to prioritize short flows, which explains its performance. sfqCoDel has comparable performance on large flows, but is 3.5×-3.8× slower on 10-100 packets at high load and 2.1×-2.4× slower on 100-1000 packet flows at low load. This is due to sfqCoDel's high packet loss rate. Cubic handles most drops using SACKs, except at the end of the flow, where drops cause timeouts. These timeouts are most apparent in the medium-sized flows. XCP is conservative in allocating bandwidth, which causes flows to finish slowly.

Queuing Delay.

Figure 16:
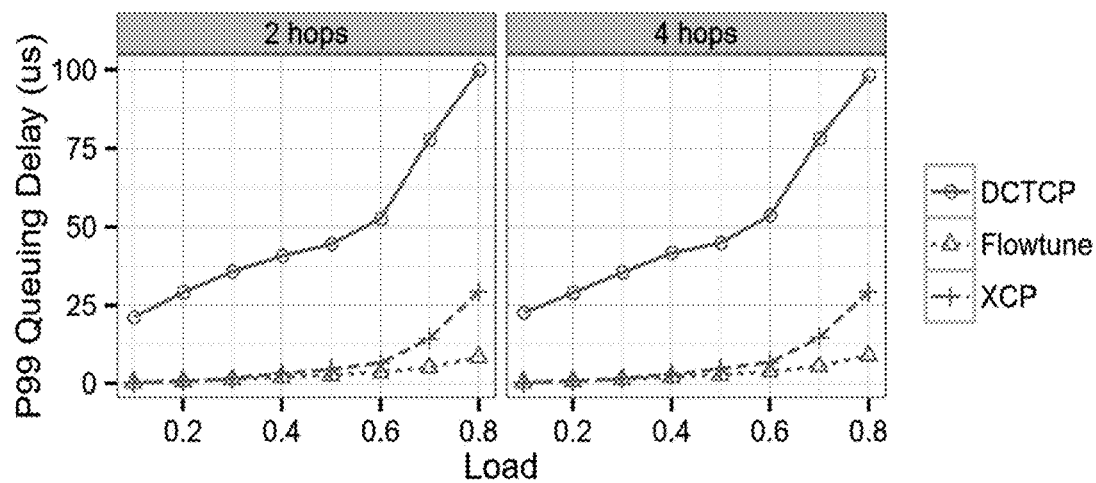

The following experiments collected queue lengths, drops, and throughput from each queue every 1 ms. FIG. 16 shows the $99^{th}$ percentile queuing delay on network paths, obtained by examining queue lengths. This queuing delay has a major contribution to 1-packet and 1-10 packet flows. Our allocator has near-empty queues, whereas DCTCP's queues are 12× longer, contributing to the significant speedup shown in FIG. 15. XCP's conservative allocation causes its queues to remain shorter. pFabric and sfqCoDel maintain relatively long queues, but the comparison is not apples-to-apples because packets do not traverse their queues in FIFO order.

Packet Drops.

Figure 17:
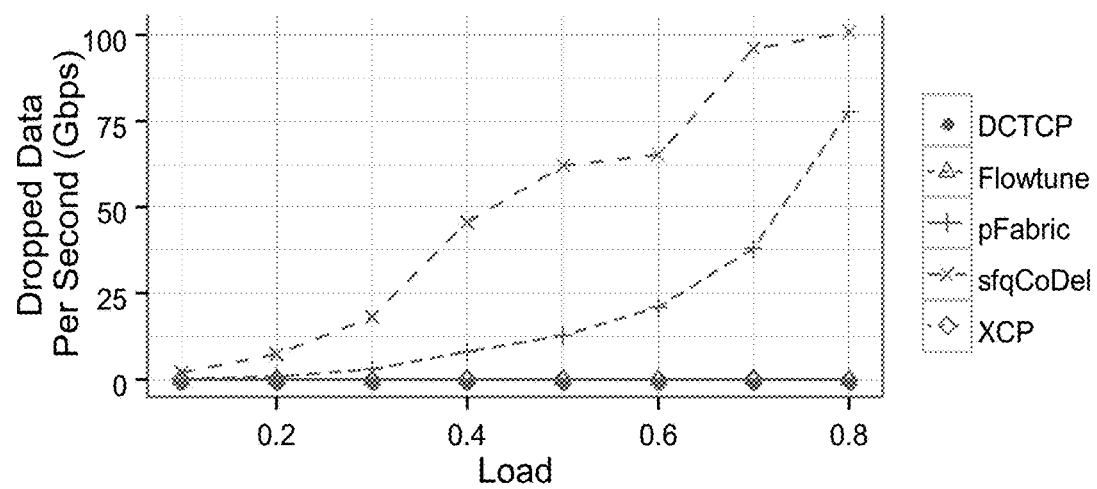

FIG. 17 shows the rate at which the network drops data, in Gigabits per second. At 0.8 load, sfqCoDel servers transmit at 1279 Gbits/s (not shown), and the network drops over 100 Gbits/s, close to 8%. These drops in themselves are not harmful, but timeouts due to these drops could result in high p99 FCT, which affects medium-sized flows (FIG. 15). Further, in a datacenter deployment of sfqCoDel, servers would spend many CPU cycles in slow-path retransmission code. pFabric's high drop rate would also make it prone to higher server CPU usage, but its probing and retransmission schemes mitigate high p99 FCT. The allocator, DCTCP, and XCP drop negligible amounts.

Fairness.

Figure 18:
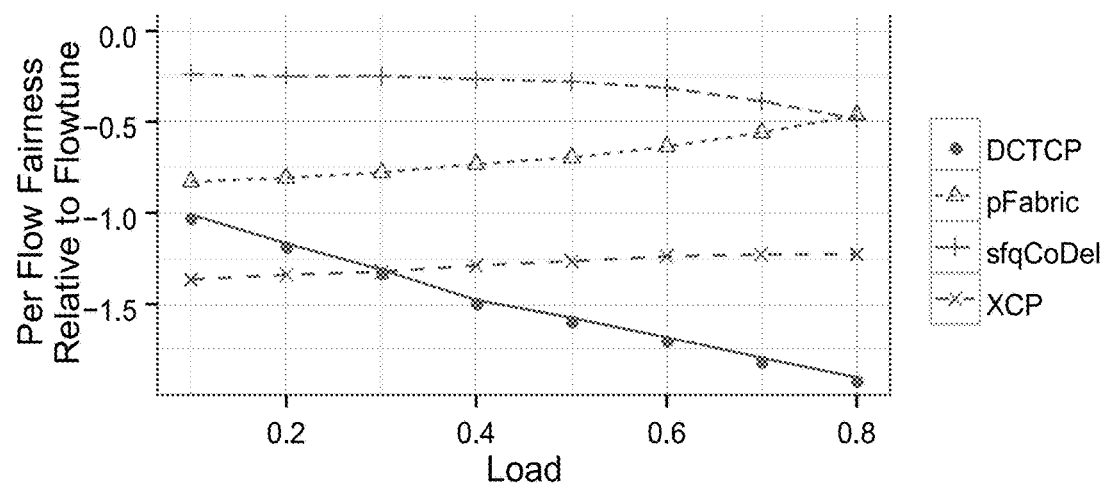

FIG. 18 shows the proportional-fairness per-flow score of the different schemes normalized to our allocator's score. A network where flows are assigned rates $r_i$ gets score $\Sigma_i$ log $2(r_i)$. This translates to gaining a point when a flow gets 2× higher rate, losing a point when a flow gets 2× lower rate. Our allocator has better fairness than the compared schemes: a flow's fairness score has on average 1.0-1.9 points more for the allocator than DCTCP, 0.45-0.83 than pFabric, 1.3 than XCP, and 0.25 than CoDel.

Normalization

Figure 19:
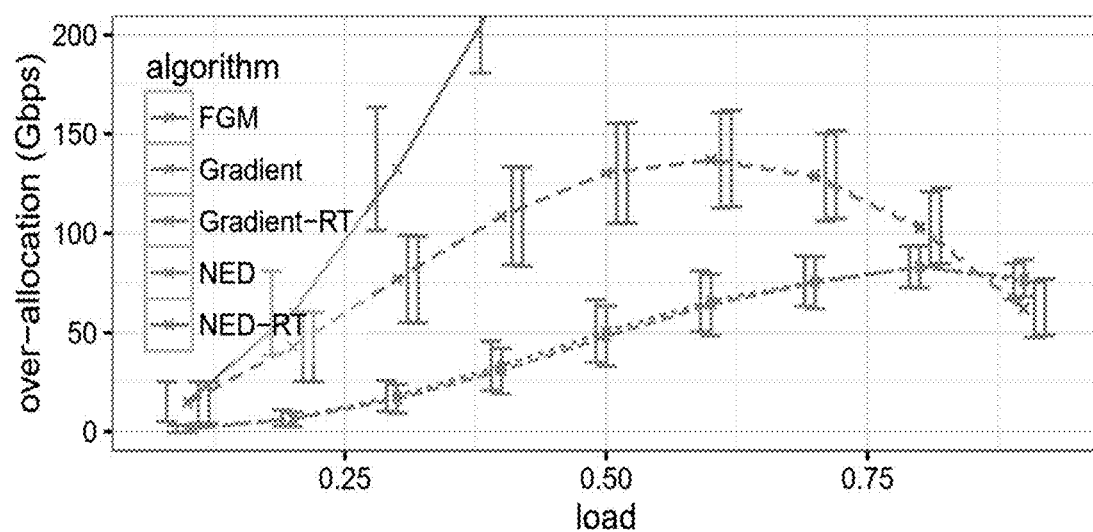

FIG. 19 shows the total amount of over-capacity allocations when there is no normalization. NED over-allocates more than Gradient because it is more aggressive at adjusting prices when flowlets arrive and leave. FGM does not handle the stream of updates well, and its allocations become unrealistic at even moderate loads.

Figure 20:
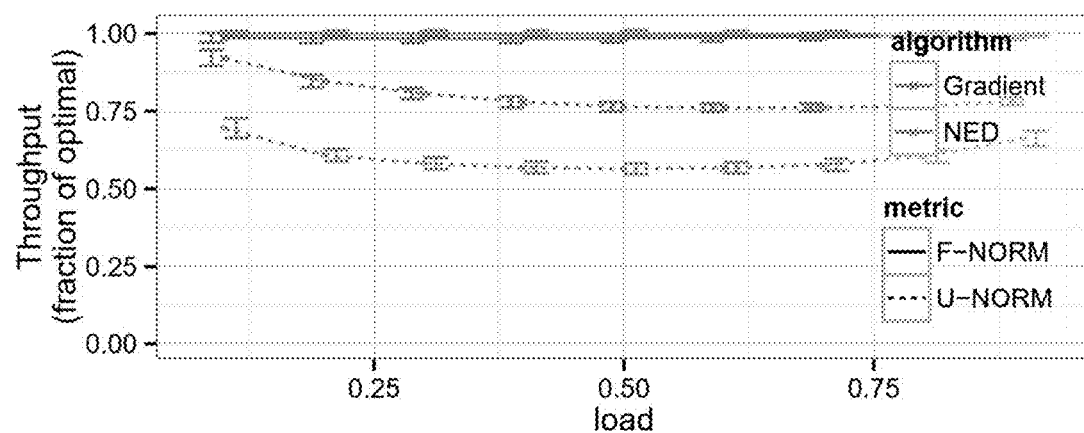

We ran Gradient and NED on the same workload and recorded their throughput. After each iteration, we ran a separate instance of NED until it converged to the optimal allocation. FIG. 20 shows U-NORM and F-NORM throughputs as a fraction of the optimal. F-NORM scales each flow based on the over-capacity allocations of links it traverses, achieving over 99.7% of optimal throughput with NED (98.4% with Gradient). In contrast, U-NORM scales flow throughput too aggressively, hurting overall performance. Gradient suffers less from U-NORM's scaling, because it adjusts rates slowly and does not over-allocate as much as NED. Note that NED with F-NORM allocations occasionally slightly exceed the optimal allocation, but not the link capacities. Rather, the allocation gets more throughput than the optimal at the cost of being a little unfair to some flows.

Path Discovery:

The allocator knows each flow's path through the network. Routing information can be computed from the network state: in ECMP-based networks, given the ECMP hash function and switch failure notifications; in SDN-based networks, given controller decisions; and in MPLS-based networks, given the MPLS configuration stream. In VL2 like networks where endpoints tunnel packets to a core switch for forwarding to the destination, and in static-routed network where endpoints have multiple subnets for different paths and the choice of subnet dictates a packet's path, endpoints can send chosen routes to the allocator.

External Traffic:

Most datacenters do not run in isolation; they communicate with other datacenters and users on the Internet. A cluster that is served by the allocator must be able to accept flows that are not scheduled by the allocator. As in Fastpass, the allocator could prioritize or separately schedule external traffic, or adopt a different approach. Fastpass uses prioritization or separately schedules external traffic. Here we propose rate allocation (centralized or not) that prioritizes allocated traffic over external traffic or schedules external traffic by queueing it at the boundary of the scheduled network and rate allocating that external traffic. (With NED, it is straightforward to dynamically adjust link capacities or add dummy flows for external traffic; a "closed loop" version of the allocator would gather network feedback observed by endpoints, and adjust its operation based on this feedback. The challenge here is what feedback to gather, and how to react to it in a way that provides some guarantees on the external traffic performance.

More Scalable Rate Update Schemes:

Experiments show rate updates have a throughput overhead of 1.12%, so each allocator NIC can update 89 servers. In small deployments of a few hundred endpoints, it might be feasible to install a few NICs in the allocator to scale. FIG. 12 shows how increasing the update threshold reduces update traffic, which can help scale a little farther, but as deployments grow to thousands of endpoints, even the reduced updates can overwhelm allocator NICs.

One relevant observation is that sending tiny rate updates of a few bytes has huge overhead: Ethernet has 64-byte minimum frames and preamble and inter-frame gaps, which cost 84-bytes, even if only eight byte rate updates are sent. A straightforward solution to scale the allocator 10× would be to employ a group of intermediary servers that handle communication to a subset of individual endpoints. The allocator sends an MTU (maximum transmission unit) to each intermediary with all updates to the intermediary's endpoints. The intermediary would in turn forward rate updates to each endpoint.

Rate Allocation.

NUMFabric also uses NUM to assign network rates, however switches must be modified to support its xWI protocol. Unlike our allocator, it is distributed, so an iteration time is coupled with network RTT and the system cannot apply global normalization to make all traffic admissible.

Several systems control datacenter routes and rates, but are geared for inter-datacenter traffic. BwE groups flows hierarchically and assigns a max-min fair allocation at each level of the hierarchy every 5-10 seconds on WAN links (similar time-scale to B4), and SWAN receives demands from non-interactive services, computes rates, and reconfigures OpenFlow switches every 5 minutes. Our allocator supports a richer set of utility functions, with orders of magnitude smaller update times.

Hedera gathers switch statistics to find elephant flows and reroutes those to avoid network hotspots. It is complementary to our allocator: integrating the two systems can give Hedera its required information with very low latency. Mordia and Datacenter TDMA compute matchings between sources and destinations using gathered statistics, and at any given time, only flows of a single matching can send. While matchings are changed relatively frequently, the set of matchings is updated infrequently (seconds). In contrast, the allocator updates allocations within tens of microseconds.

Path Discovery.

traceroute uses UDP packets by default, and tcptraceroute uses TCP SYN packets, so both are unsuitable for probing paths on existing links. paratrace sends TCP KeepAlives, causing dup-ACKs to be sent in reply, and relies on the IP ID field, which does not exist in IPv6. Sidecar sends replayed packets designed to look like retransmissions, and also causing dup-ACKs, and tries to mitigate disturbance by scheduling all probes that might reach the destination 500 ms apart. Implementations of our approach can prevent dup-ACKs by mutilating the TCP checksum, can support both IPv4 and IPv6 by using sequence numbers to identify packets, and require no delay between probes.

NED.

The first-order methods do not estimate $H_{ll}$ or use crude proxies. Gradient projection adjusts prices with no weighting. Fast Weighted Gradient uses a crude upper bound on the convexity of the utility function as a proxy for $H_{ll}$.

The Newton-like method, like NED, strives to use $H_{ll}$ to normalize price updates, but it uses network measurements to estimate its value. These measurements increase convergence time and have associated error; we have found the algorithm is unstable in several settings. Our allocator, in contrast, computes $H_{ll}$ explicitly from flow utilities, saving the time required to obtain estimates, and getting an error-free result.

Recent work proposes a different formulation of the problem, with equality constraints rather than inequalities. While the scheme holds promise for faster convergence, iterations are much more involved and hence slower to compute, making the improvement questionable. Accelerated Dual Descent does not use the flow model: it doesn't care what destination data arrives at, only that all data arrives at some destination. However, the method is notable for updating a link's price $p_l$ based not only on the link's current and desired throughput, but also on how price changes to other links $p_k$ affect it. Adapting the method to the flow setting could reduce the number of required iterations to convergence (again at the cost of perhaps increasing iteration runtime).

Parallel Architectures.

Conflict-free Replicated Data Types (CRDTs) allow distributed data structure updates without synchronization and then achieve eventual consistency through an arbitrary sequence of state merges. The allocator's LinkBlock aggregation scheme allows distributed updates, but guarantees consistency after a fixed number of merges and bounds communication throughput.

In the delegation parallel design pattern, all updates to a data structure are sent to a designated processor which then has exclusive access. In our approach, the endpoint processors, however, perform the large bulk of updates to link state locally.

In flat-combining, concurrent users of a data structure write their requests in local buffers, and then the first user to obtain a global lock services requests of all waiting users. Our LinkBlock aggregation assigns responsibility for aggregation in a regular pattern and does not incur the cost of competition between processors for global locks.

Other implementations are also within the scope of the claims.

The invention claimed is:

1. A method for controlling flow rates of traffic among endpoints in a network, the method comprising:
    receiving notifications about flowlets originating or received at the endpoints, each of the flowlets comprising one or more packets that are in a queue associated with the flowlet,
    in response to the received notifications, computing updated flow rates for the flowlets, in which the computing of the updated flow rates for the flowlets comprises applying an explicit optimization process, in which the optimization process comprises a modified Newton-like method, in which the modified Newton-like method comprises an optimization process that finds prices for links of the network, the prices comprising penalties for exceeding capacities of links of the network, and sending the updated flow rates to devices for use in controlling the flow rates for the flowlets in accordance with the computed updated flow rates.

2. The method of claim 1 in which the notifications are received from the devices or other devices in the network including switches or other devices at which flow is monitored.

3. The method of claim 1 in which the devices include switches or other implementation devices.

4. The method of claim 1 in which the network comprises links and each of two or more processing cores receives the notifications only with respect to a particular subset of the links and sends the updated flow rates only for flowlets associated with the particular subset of the links.

5. The method of claim 4 in which the respective particular subsets of links to be received by respective processing cores are based on the number of processing cores that will process flows carried on the links.

6. The method of claim 5 in which each of the links comprises a half-duplex or other single-directional link.

7. The method of claim 1 in which the modified Newton-like method comprises applying LaGrange multipliers.

8. The method of claim 1 in which the computing of the updated flow rates for the flowlets comprises estimating effects on flows that will occur as a result of one or more of the updates.

9. The method of claim 1 in which the updated flow rates are computed to reach a global network resource allocation objective.

10. The method of claim 1 in which the updated flow rates are computed to reduce over-allocation of flows on links of the network.

11. The method of claim 1 in which the updated flow rates are computed to reduce delays in the queues.

12. The method of claim 1 in which the notifications are received from the devices and the updated flow rates are sent to the devices through a kernel bypass.

13. The method of claim 1 comprising applying a rate normalizer to the updated flow rates.

14. The method of claim 13 in which the rate normalizer normalizes rates to link capacities.

15. The method of claim 1 in which the computing of updated flow rates comprises organizing the computation based on flow blocks and link blocks.

16. The method of claim 1 in which the updated flow rates are computed based on information about applications that are associated with the flowlets.

17. The method of claim 16 in which the information about the application includes at least one of the identity of the application that started a flow, the identity of a user who started the application, a CPU load generated by the application, what files are open for the application, the read and write throughputs in aggregate or to each individual file, or the amount of memory used by the application.

18. The method of claim 1 in which sending the updated flow rates to devices for use in controlling flow rates comprises sending the updated flow rates only when the updated flow rates change by a factor larger than a threshold.

19. The method of claim 1 in which sending the updated flow rates to devices for use in controlling flow rates comprises sending the updated flow rates from intermediary servers that are associated with respective subsets of the endpoints.

20. The method of claim 1 comprising tracing the paths of flows in the network.

21. The method of claim 20 in which the paths of flows are determined based on at least one of ECMP hashes of the flow, or a software defined networking controller, tunneling configuration, or MPLS configuration associated with the flow.

22. A method for controlling flow rates of traffic among endpoints in a network, the method comprising:
    receiving notifications about flowlets originating or received at the endpoints, each of the flowlets comprising one or more packets that are in a queue associated with the flowlet,
    in response to the received notifications, computing updated flow rates for the flowlets, sending the updated flow rates to devices for use in controlling the flow rates for the flowlets in accordance with the computed updated flow rates, and tracing the paths of flows in the network, in which the tracing comprises mutilating a TCP checksum to cause an endpoint to drop a probe packet without terminating a connection or notifying an application.

23. The method of claim 22 in which the computing of the updated flow rates for the flowlets comprises applying an explicit optimization process.

24. The method of claim 23 in which the optimization process comprises a modified Newton-like method.

25. The method of claim 24 in which the modified Newton-like method comprises an optimization process that finds prices for links of the network.

26. The method of claim 23 in which the optimization process uses a network utility maximization framework.

27. The method of claim 23 in which the optimization process uses a weighted proportional fairness objective.

28. The method of claim 23 in which the computing of the updated flow rates for the flowlets comprises reusing computations performed when computing previous updated flow rates.

29. The method of claim 22 in which the tracing comprises opening a raw socket.

30. The method of claim 22 in which the tracing comprises sending multiple probes in parallel distinguished by sequence number.

* * * * *